United States Patent
Ueki

(10) Patent No.: US 8,803,482 B2
(45) Date of Patent: Aug. 12, 2014

(54) NONAQUEOUS ELECTROLYTE TYPE SECONDARY BATTERY SYSTEM AND VEHICLE

(75) Inventor: Tomoyoshi Ueki, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 376 days.

(21) Appl. No.: 13/057,165

(22) PCT Filed: Jan. 8, 2009

(86) PCT No.: PCT/JP2009/050104
§ 371 (c)(1),
(2), (4) Date: Feb. 2, 2011

(87) PCT Pub. No.: WO2010/079595
PCT Pub. Date: Jul. 15, 2010

(65) Prior Publication Data
US 2011/0270477 A1    Nov. 3, 2011

(51) Int. Cl.
*H02J 7/00* (2006.01)
*B60L 9/00* (2006.01)
*B60L 11/00* (2006.01)
*G05D 1/00* (2006.01)
*G05D 3/00* (2006.01)
*G06F 7/00* (2006.01)

(52) U.S. Cl.
USPC ............................ 320/134; 701/22

(58) Field of Classification Search
CPC ........................................................ H02J 7/00
USPC ............. 701/22; 320/128–137; 429/7, 50–52, 429/61; 700/286; 180/65.21, 65.1, 68.5
See application file for complete search history.

(56) References Cited

FOREIGN PATENT DOCUMENTS

| JP | 9-97625 | 4/1997 | |
|---|---|---|---|
| JP | 10-253725 | 9/1998 | |
| JP | 2002-315211 | 10/2002 | |
| JP | 2003-17138 | 1/2003 | |
| JP | 2003-294817 | 10/2003 | |
| JP | 2004-14403 | 1/2004 | |
| JP | 2006-149181 | * 6/2006 | ............... H02J 7/00 |

(Continued)

OTHER PUBLICATIONS

English Translation of JP2006-149181.*

(Continued)

*Primary Examiner* — Patrick Ryan
*Assistant Examiner* — Kiran Quraishi
(74) *Attorney, Agent, or Firm* — Finnegan, Henderson, Farabow, Garrett & Dunner LLP

(57) ABSTRACT

A purpose is to provide a nonaqueous electrolyte type lithium ion secondary battery system, a control method, and a vehicle using the system, arranged to prevent unevenness of a salt concentration distribution in an electrolyte, avoiding an increase in internal resistance, thus improving endurance of the nonaqueous electrolyte type lithium ion secondary battery. For a measuring time (S101 to S104), a charge threshold current Ic and a discharge threshold current Id are read out (S102) and a charge hysteresis value Cc and a discharge hysteresis value Cd are calculated (S103). The charge hysteresis value Cc and the discharge hysteresis value Cd are compared (S105). If the charge hysteresis value Cc is larger than the discharge hysteresis value Cd (S105: Yes), a current value on a charge side is limited (S106). To the contrary, if the charge hysteresis value Cc is equal to or smaller than the discharge hysteresis value Cd (S105: No), a current value on a discharge side is limited (S107).

20 Claims, 15 Drawing Sheets

(56) References Cited

FOREIGN PATENT DOCUMENTS

| JP | 2006149181 A | * | 6/2006 | ................ H02J 7/00 |
| JP | 2007-236151 | | 9/2007 | |
| JP | 2008-22596 | | 1/2008 | |
| WO | WO 99/45404 | | 9/1999 | |

OTHER PUBLICATIONS

International Search Report in International Application No. PCT/JP2009/050104; Mailing Date: Mar. 3, 2009.

* cited by examiner

FIG. 12

Ic    SOC

|     | 20 | ... | 90 |
|-----|----|----|----|
| -40 |    |    |    |
|     |    |    |    |
| ⋮   |    |    |    |
|     |    |    |    |
| 70  |    |    |    |

TEMP.

FIG. 13

Id    SOC

|     | 20 | ... | 90 |
|-----|----|----|----|
| -40 |    |    |    |
|     |    |    |    |
| ⋮   |    |    |    |
|     |    |    |    |
| 70  |    |    |    |

TEMP.

NONAQUEOUS ELECTROLYTE TYPE SECONDARY BATTERY SYSTEM AND VEHICLE

CROSS-REFERENCE TO RELATED APPLICATIONS

This is a national phase application based on the PCT International Patent Application No. PCT/JP2009/050104 filed on Jan. 8, 2009, the entire contents of which are incorporated herein by reference.

TECHNICAL FIELD

The present invention relates to a control apparatus for a lithium ion secondary battery and others to be used in a hybrid vehicle, an electric vehicle, or others. More particularly, the present invention relates to a nonaqueous electrolyte type secondary battery system for preventing deterioration of a lithium ion secondary battery and others due to high-rate charge/discharge, and a vehicle.

BACKGROUND ART

A secondary battery is repeatedly charged and discharged. For instance, a secondary battery mounted in a hybrid vehicle or an electric vehicle is charged and discharged with a large current (high-rate charge/discharge). Therefore, a nonaqueous electrolyte type lithium ion battery having a high energy density and a superior high-rate charge and discharge property has been developed for use in a vehicle. However, it is known that even the nonaqueous electrolyte type lithium ion secondary battery increases in internal resistance due to repeated charge and discharge with a large current (e.g., Patent Literature 1).

A nonaqueous electrolyte type lithium ion secondary battery arranged to restrain such an increase in internal resistance is disclosed in Patent Literature 1. In Patent Literature 1, a conductive layer is placed between an electrode current collector and an electrode material mixture layer to prevent deterioration of an electrode body. Accordingly, the nonaqueous electrolyte type lithium ion secondary battery restrains a decrease in voltage.

CITATION LIST

Patent Literature

Patent Literature 1: JP 9 (1997)-97625A

SUMMARY OF INVENTION

Technical Problem

As a result of research and development by the present applicant, thereafter, it has been revealed that the increase in internal resistance is caused by the aforementioned reason related to the electrode and also an uneven salt concentration distribution of an electrolyte. Herein, the uneven or irregular salt concentration distribution represents that a difference appears in a salt concentration near electrodes and near an intermediate point between electrodes. It is conceivable that this uneven salt concentration distribution is caused by execution of high-rate charge and discharge.

Further, the unevenness of a salt concentration is considered to relate to viscosity of electrolyte, transfer velocity of ions in the electrolyte, and others. For example, when the salt concentration near the electrode decreased, a reaction on the electrode surface inevitably lowers, resulting in an increase in internal resistance. When such use condition continues, the salt concentration distribution may remain uneven. Unless any measures are taken, therefore, a battery performance will decrease and a battery endurance life will shorten.

As mentioned above, the increase in internal resistance resulting from the electrode could be prevented by a conventional technique (Patent Literature 1 and others) adopting some measures for electrodes. However, the increase in internal resistance resulting from the salt concentration distribution in the electrolyte solution could not be solved by the invention (Patent Literature 1 and others) adopting some measures for electrodes.

The present invention has been made to solve the above problems and has a purpose to provide a nonaqueous electrolyte type lithium ion secondary battery system capable of preventing the unevenness of a salt concentration distribution in an electrolyte to avoid an increase in internal resistance and improving durability of a nonaqueous electrolyte type lithium ion secondary battery, and a vehicle using the system.

Solution to Problem

To achieve the above purpose, the invention provides a nonaqueous electrolyte type secondary battery system comprising: a nonaqueous electrolyte type secondary battery; and a control part for controlling the nonaqueous electrolyte type secondary battery, wherein the control part includes: a charge and discharge hysteresis value calculating part for calculating, at predetermined time intervals, a charge hysteresis value Cc representing a history of charge with a current exceeding a predetermined charge threshold current Ic, and a discharge hysteresis value Cd representing a history of discharge with a current exceeding a predetermined discharge threshold current Id; and a current limiting part for limiting the charge current or the discharge current after a difference between the charge hysteresis value Cc and the discharge hysteresis value Cd is determined to be larger than a predetermined degree, the current limiting part is arranged to: limit the charge current when the charge hysteresis value Cc is larger than the discharge hysteresis value Cd, and limit the discharge current when the charge hysteresis value Cc is smaller than the discharge hysteresis value Cd. The nonaqueous electrolyte type secondary battery system can prevent the salt concentration distribution from becoming uneven in the electrolyte even when high-rate charge and discharge is performed. This prevents an increase in internal resistance. Thus, the nonaqueous electrolyte type secondary battery can have a prolonged endurance life.

In the aforementioned nonaqueous electrolyte type secondary battery system, the nonaqueous electrolyte type secondary battery may be a nonaqueous electrolyte type lithium ion secondary battery. Accordingly, the present system can also prevent a salt concentration distribution in an electrolyte of the nonaqueous electrolyte type lithium ion secondary battery system due to the high-rate charge and discharge.

In the aforementioned nonaqueous electrolyte type secondary battery system, preferably, the current limiting part is adapted to: limit the charge current when the charge hysteresis value Cc is equal to or larger than a value calculated by adding a predetermined positive reference value to the discharge hysteresis value Cd; and limit the discharge current when the discharge hysteresis value Cd is equal to or larger than a value calculated by adding a predetermined positive reference value to the charge hysteresis value Cc. Accordingly, the high-rate charge or the high-rate discharge is performed in a balanced manner, thereby preventing the salt concentration distribution in the electrolyte from becoming uneven.

In the aforementioned nonaqueous electrolyte type secondary battery system, the current limiting part may be adapted to: limit the charge current when a ratio of the charge hysteresis value Cc to the discharge hysteresis value Cd is larger than a first reference value that is a predetermined number equal to or larger than 1; and limit the discharge current when a ratio of the discharge hysteresis value Cd to the charge hysteresis value Cc is larger than a second reference value that is a predetermined number equal to or larger than 1. Similarly, the high-rate charge or the high-rate discharge is performed in a balanced manner, thereby preventing the salt concentration distribution in the electrolyte from becoming uneven.

In the aforementioned nonaqueous electrolyte type secondary battery system, the current limiting part may perform no current limiting when the ratio of the charge hysteresis value Cc to the discharge hysteresis value Cd is equal to or smaller than the first reference value, and the ratio of the discharge hysteresis value Cd to the charge hysteresis value Cc is equal to or smaller than the second reference value. Consequently, the current limiting does not always have to be performed when the difference between the charge hysteresis value Cc and the discharge hysteresis value Cd is small. Without the current limiting, an available current region does not narrow.

In the aforementioned nonaqueous electrolyte type secondary battery system, preferably, the charge and discharge hysteresis value calculating part uses, as the charge hysteresis value Cc, a value defined by the following expression:

$$Cc=|\int[I(t)-Ic(t)]dt|$$

where an integral interval is an interval of time "t" in which $I(t) \geq Ic(t)$ is established, and Ic(t) is a predetermined threshold current, and as the discharge hysteresis value Cd, a value defined by the following expression:

$$Cd=|\int[I(t)-Id(t)]dt|$$

where an integral interval is an interval of time "t" in which $I(t) \leq Id(t)$ is established, and Id(t) is a predetermined threshold current.

It is accordingly possible to numerically evaluate how much the high-rate charge and the high-rate discharge have been performed.

In the aforementioned nonaqueous electrolyte type secondary battery system, the charge and discharge hysteresis value calculating part may use, as the charge hysteresis value Cc, a value defined by the following expression:

$$Cc=|\int I(t)dt|$$

where an integral interval is an interval of time "t" in which $I(t) \geq Ic(t)$ is established, and Ic(t) is a predetermined threshold current, and as the discharge hysteresis value Cd, a value defined by the following expression:

$$Cd=|\int I(t)dt|$$

where an integral interval is an interval of time "t" in which $I(t) \leq Id(t)$ is established, and Id(t) is a predetermined threshold current. Accordingly, it is similarly possible to numerically evaluate how much the high-rate charge and the high-rate discharge have been performed.

In the aforementioned nonaqueous electrolyte type secondary battery system, the charge and discharge hysteresis value calculating part may use, as the charge hysteresis value Cc, a value defined by the following expression:

$$Cc=Ic \cdot Tc$$

where Tc is a time in which $I(t) \geq Ic$ was established, and as the discharge hysteresis value Cd, a value defined by the following expression:

$$Cd=Id \cdot Td$$

where Td is a time in which $I(t) \geq Id$ was established. Accordingly, it is similarly possible to numerically evaluate how much the high-rate charge and the high-rate discharge have been performed.

In the aforementioned nonaqueous electrolyte type secondary battery system, the charge and discharge hysteresis value calculating part may use, as the charge hysteresis value Cc, a value defined by the following expression:

$$Cc=Imax \cdot Tc$$

where Tc is a time in which $I(t) \geq Ic$ was established, and

Imax: a maximum current value within the measuring time, and as the discharge hysteresis value Cd, a value defined by the following expression:

$$Cd=Imin \cdot Td$$

where Td is a time in which $I(t) \leq Id$ was established,

Imin: a minimum current value within the measuring time. Accordingly, it is similarly possible to numerically evaluate how much the high-rate charge and the high-rate discharge have been performed.

In the aforementioned nonaqueous electrolyte type secondary battery system, the charge and discharge hysteresis value calculating part may use, as the charge hysteresis value Cc, a time Tc in which $I(t) \geq Ic$ was established, and as the discharge hysteresis value Cd, a time Td in which $I(t) \leq Id$ was established. Accordingly, it is similarly possible to numerically evaluate how much the high-rate charge and the high-rate discharge have been performed.

In the aforementioned nonaqueous electrolyte type secondary battery system, the charge and discharge hysteresis value calculating part may use, as the charge hysteresis value Cc, an accumulated hysteresis value SCc calculated by adding a currently calculated charge hysteresis value Cc to a sum of charge hysteresis values Cc calculated previously, and as the discharge hysteresis value Cd, an accumulated hysteresis value SCd calculated by adding a currently calculated discharge hysteresis value Cd to a sum of discharge hysteresis values Cd calculated previously. It is therefore possible to numerically evaluate how much the high-rate charge and the high-rate discharge have been performed after the nonaqueous electrolyte type secondary battery was manufactured.

In the aforementioned nonaqueous electrolyte type secondary battery system, more preferably, when a current value when the current limiting is assumed not performed exceeds a predetermined limit value, the current limiting part flows a current of the limit value instead of the current value with no current limiting. This configuration therefore can limit the high-rate charge and discharge.

In the aforementioned nonaqueous electrolyte type secondary battery system, preferably, the current limiting part flows a current of a value calculated by multiplying a current value when the current limiting is assumed not performed by a predetermined coefficient smaller than 1. Accordingly, this configuration can also limit the high-rate charge and discharge.

The aforementioned nonaqueous electrolyte type secondary battery system may be arranged such that when a current value when the current limiting is assumed not performed exceeds a predetermined limit value, the current limiting part flows a current corresponding to a sum of a value calculated by multiplying an excess amount of the current value exceeding the limit value by a predetermined coefficient smaller than 1 and the limit value instead of the current value with no current limiting. Accordingly, this configuration can also limit the high-rate charge and discharge.

In the aforementioned nonaqueous electrolyte type secondary battery system, preferably, the current limiting part sets, for limiting the charge current, a value of the discharge threshold current Id to be used in a next measurement to be larger than a value in a previous measurement, and for limiting the discharge current, a value of the charge threshold current Ic to be used in the next measurement to be larger than a value in the previous measurement. Accordingly, a current region available for charge and discharge can be set broadly.

In the aforementioned nonaqueous electrolyte type secondary battery system, more preferably, the charge and discharge hysteresis value calculating part uses, as the charge threshold current Ic, a smaller value in absolute value as an SOC (State of Charge) value is larger and a larger value in absolute value as the SOC value is smaller, and a larger value in absolute value as a battery temperature is higher and a smaller value in absolute value as the battery temperature is lower, and as the discharge threshold current Id, a larger value in absolute value as the SOC value is larger and a smaller value in absolute value as the SOC value is smaller, and a larger value in absolute value as the battery temperature is higher and a smaller value in absolute value as the battery temperature is lower. Accordingly, the charge threshold current Ic and the discharge threshold current Id are closely related to the salt concentration distribution in the electrolyte can be set. This makes it possible to perform the current limiting more reflecting the salt concentration distribution.

A vehicle according to the invention comprises: a motor; a nonaqueous electrolyte type secondary battery; and a control part for controlling the nonaqueous electrolyte type secondary battery, wherein the control part includes: charge and discharge hysteresis value calculating part for calculating, at predetermined time intervals, a charge hysteresis value Cc representing a history of charge with a current exceeding a predetermined charge threshold current Ic, and a discharge hysteresis value Cd representing a history of discharge with a current exceeding a predetermined discharge threshold current Id; and a current limiting part for limiting the charge current or the discharge current after a difference between the charge hysteresis value Cc and the discharge hysteresis value Cd is determined to be larger than a predetermined degree, the current limiting part is arranged to: limit the charge current when the charge hysteresis value Cc is larger than the discharge hysteresis value Cd, and limit the discharge current when the charge hysteresis value Cc is smaller than the discharge hysteresis value Cd. The above vehicle can prevent the salt concentration distribution in the electrolyte from becoming uneven even when the high-rate charge and discharge are performed. This prevents an increase in internal resistance. Consequently, the nonaqueous electrolyte type secondary battery in the vehicle can have a prolonged endurance life.

Furthermore, a nonaqueous electrolyte type secondary battery system according to the present invention comprises: a nonaqueous electrolyte type secondary battery; and a control part for controlling the nonaqueous electrolyte type secondary battery, wherein the control part includes: a charge and discharge hysteresis value calculating part for calculating, at predetermined time intervals, a charge hysteresis value Cc representing a history of charge with a current exceeding a predetermined charge threshold current Ic, and a discharge hysteresis value Cd representing a history of discharge with a current exceeding a predetermined discharge threshold current Id; and a salt concentration estimating part for estimating a salt concentration distribution in an electrolyte of the nonaqueous electrolyte type secondary battery based on the charge hysteresis value Cc and the discharge hysteresis value Cd. The nonaqueous electrolyte type secondary battery system can estimate the salt concentration distribution in the electrolyte. Thus, the coming of endurance life of the nonaqueous electrolyte type secondary battery can be determined.

Furthermore, a vehicle according to the present invention comprises: a motor; a nonaqueous electrolyte type secondary battery; and a control part for controlling the nonaqueous electrolyte type secondary battery, wherein the control part includes: a charge and discharge hysteresis value calculating part for calculating, at predetermined time intervals, a charge hysteresis value Cc representing a history of charge with a current exceeding a predetermined charge threshold current Ic, and a discharge hysteresis value Cd representing a history of discharge with a current exceeding a predetermined discharge threshold current Id; and a salt concentration estimating part for estimating a salt concentration distribution in an electrolyte of the nonaqueous electrolyte type secondary battery based on the charge hysteresis value Cc and the discharge hysteresis value Cd. The above vehicle can estimate the salt concentration distribution in the electrolyte. Thus, the coming of endurance life of the nonaqueous electrolyte type secondary battery can be determined.

Advantageous Effects of Invention

Accordingly, the present invention can provide a nonaqueous electrolyte type lithium ion secondary battery system capable of preventing the unevenness of a salt concentration distribution in an electrolyte, thereby avoiding an increase in internal resistance, thus improving durability of a nonaqueous electrolyte type lithium ion secondary battery, and a vehicle using the system.

BRIEF DESCRIPTION OF DRAWINGS

FIG. 12 is a battery temperature-SOC dependence map to set a charge threshold current Ic in the fourth embodiment;

FIG. 13 is a battery temperature-SOC dependence map to set a discharge threshold current Id in the fourth embodiment;

REFERENCE SIGNS LIST

Figure 1:
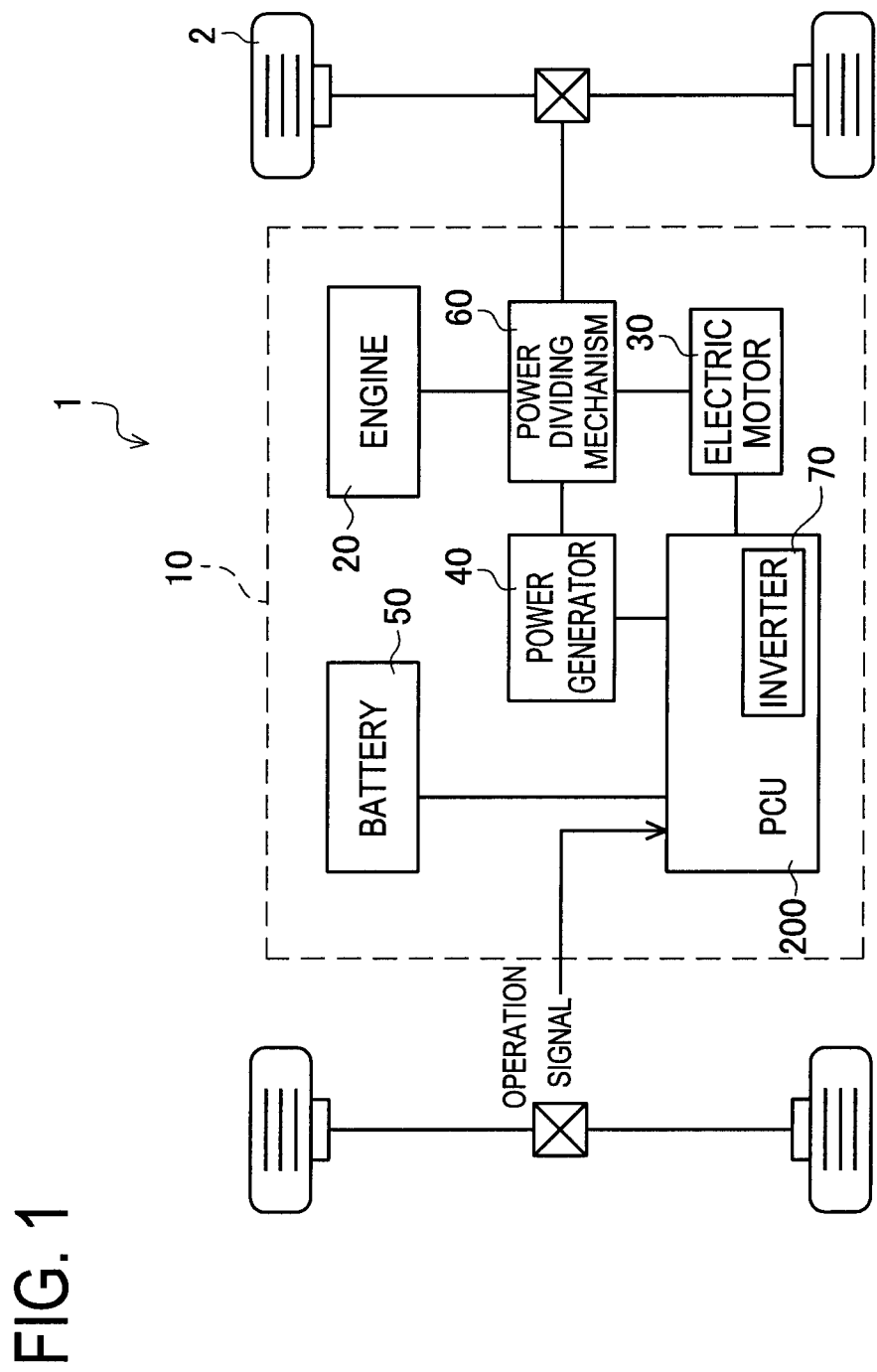
FIG. 1 is a schematic configuration view to explain a hybrid vehicle according to the present invention.

1 Hybrid vehicle
10 Hybrid system
20 Engine
30 Electric motor
40 Power generator
50 Battery
60 Power dividing mechanism
70 Inverter
100 Battery system
151 Battery control part
152 Voltage measuring part
153 Current measuring part
154 Temperature measuring part
155 Memory
200 Power control unit (PCU)

DESCRIPTION OF EMBODIMENTS

A detailed description of a preferred embodiment of the present invention will now be given referring to the accompanying drawings. The present embodiment embodies the present invention in the form of a control apparatus of a nonaqueous electrolyte type lithium ion secondary battery to be used in a hybrid vehicle, and a hybrid vehicle.

First Embodiment (Entire Schematic Configuration)

FIG. 1 shows a schematic configuration of a hybrid vehicle 1 in this embodiment. A hybrid system 10 in the hybrid vehicle 1 in this embodiment is configured to drive the hybrid vehicle 1 by supplying power output from an engine 20 and an electric motor 30 to tires 2 through a power dividing mechanism 60. The hybrid system 10 includes the engine 20, the electric motor 30, a power generator 40, a battery 50, the power dividing mechanism 60, and a power control unit (PCU) 200.

PCU 200 includes an inverter 70 as shown in FIG. 1. The inverter 70 is arranged to convert a direct current of the battery 50 into a three-phase alternating current of the motor 30 and the power generator 40, and vice versa.

The engine 20 and the electric motor 30 are arranged to drive the hybrid vehicle 1. Power output from the engine 20 and power output from the electric motor 30 are transmitted to the tires 2 through the power dividing mechanism 60. This mechanism 60 is configured to switch between the power of the engine 20 and the power of the electric motor 30. The mechanism 60 is also configured to combine the powers output from the engine 20 and electric motor 30 to enable the hybrid vehicle 1 to run at higher energy efficiency.

The electric motor 30 can serve as a power generator that generates power at the time of deceleration of the hybrid vehicle 1. Electric energy obtained by this power generation is stored in the battery 50. The power generator 40 generates power by rotational energy of the engine 20 and stores the electric energy in the battery 50 through the inverter 70.

The battery 50 is configured to supply electric power to the electric motor 30 through the inverter 70 attached to the PCU 200. The battery 50 is a battery pack in which a plurality of battery cells each being a lithium ion secondary battery containing a lithium ion conductive nonaqueous electrolyte, the cells being connected to one another in series.

The battery 50 also includes a positive active material and a negative active material, each being made of a material capable of absorbing and releasing lithium ions. A positive electrode of the battery 50 is made of an aluminum plate or the like applied with the positive active material. A negative electrode is made of a copper plate or the like applied with the negative active material.

As the positive active material of the battery 50, a lithium composite oxide is usable, such as lithium nickel oxide ($LiNiO_2$), lithium manganese oxide ($LiMnO_2$), and lithium cobalt oxide ($LiCoO_2$). Further, as the negative active material, a carbonaceous material is usable, such as amorphous carbon, hard-graphitized carbon, easy-graphitized carbon, and graphite.

The electrolyte solution of the battery 50 is prepared by dissolving an electrolyte material in a nonaqueous organic solvent. For example, the nonaqueous organic solvent may include an ester solvent such as propylene carbonate (PC), ethylene carbonate (EC), dimethyl carbonate (DMC), methyl ethyl carbonate (MEC), an organic liquid solvent prepared by mixing an ether solvent or the like such as γ-butyrolacton (γ-BL) and diethoxyethane (DEE) with an ester solvent. As salt which is an electrolyte material, lithium salt may be used, such as lithium perchlorate ($LiClO_4$), lithium fluoroborate ($LiBF_4$), and lithium hexafluorophosphate ($LiPF_6$).

In the hybrid vehicle 1, the PCU 200 serves to integrally control the power of the engine 20 and the power of the electric motor 30 for efficient use thereof. The PCU 200 is arranged to achieve optimal running by use of the engine 20 and the electric motor 30 in response to operation signals from an accelerator pedal, a brake pedal, a shift lever, and others.

The PCU 200 is also arranged to control the electric motor 30 and the power generator 40, to control charge or discharge of the battery 50, and further to control the quantity of electric power to be supplied according to required output of the electric motor 30 and others. Further, the PCU 200 performs current limiting to prevent a salt concentration distribution in the electrolyte of the battery 50 from becoming uneven as explained in detail later.

(Battery System)

Figure 2:
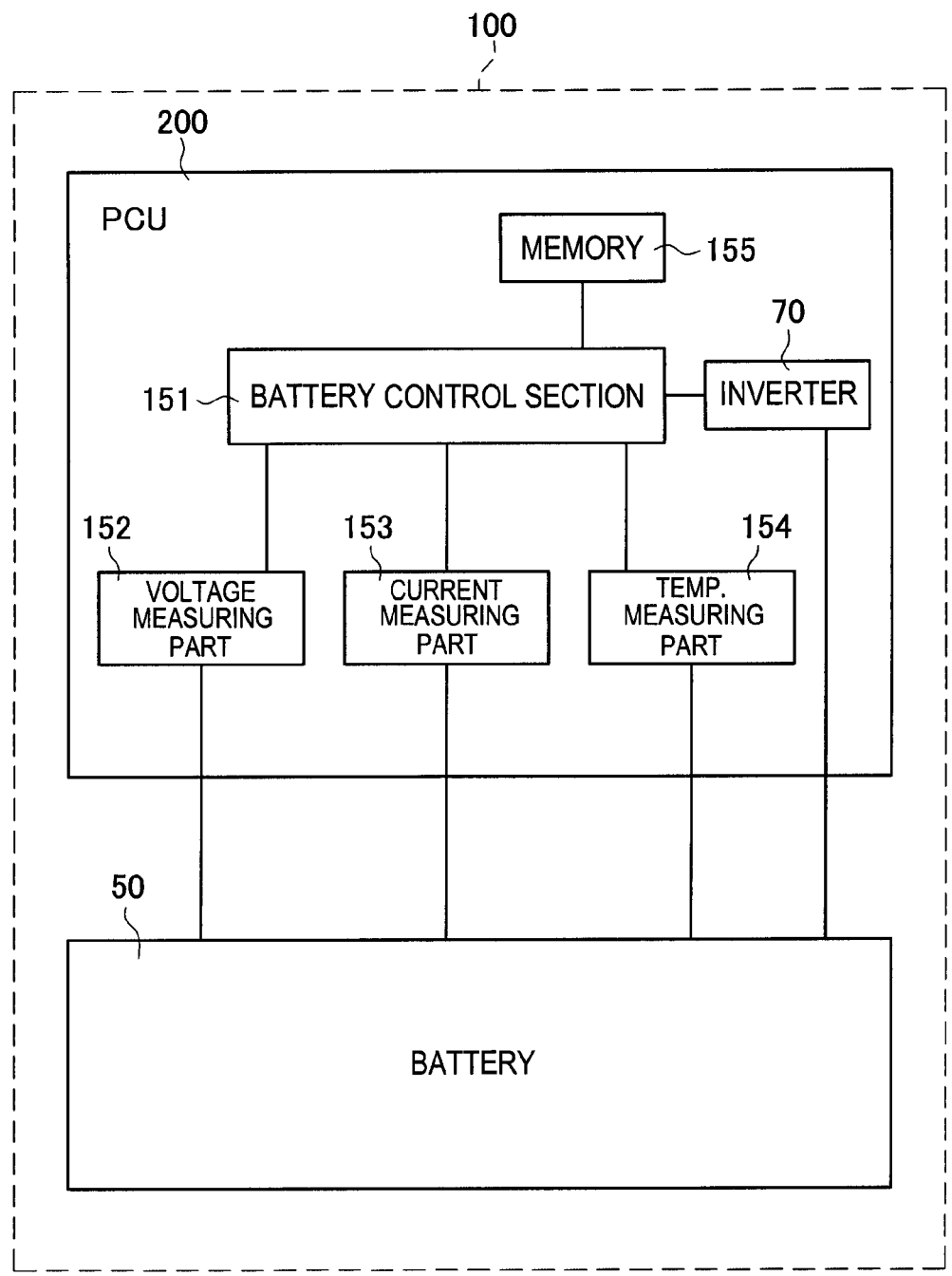
FIG. 2 is a schematic configuration view to explain a battery system according to the present invention.

Herein, a battery system 100 in the present embodiment will be explained referring to FIG. 2. FIG. 2 shows only the battery 50 and the PCU 200 of the hybrid system 10 shown in FIG. 1. The battery system 100 is a nonaqueous electrolyte type lithium ion secondary battery system including the battery 50 and the PCU 200. The battery system 100 thus constitutes a part of the hybrid system 10 and the hybrid vehicle 1.

The PCU 200 is a controller including, in addition to the inverter 70, a battery control part 151, a voltage measuring part 152, a current measuring part 153, a temperature measuring part 154, and a memory 155 as shown in FIG. 2. The voltage measuring part 152 measures the voltage of each battery cell constituting the battery 50 which is a battery pack and transmits a measurement value to the battery control part 151. The current measuring part 153 measures the current flowing in a circuit connected to the battery 50 and transmits a measurement value to the battery control part 151. The temperature measuring part 154 measures the temperature of each battery cell constituting the battery 50 and transmits a measurement value to the battery control part 151.

The battery control part 151 performs current controlling of the battery 50 through the inverter 70. The battery control part 151 can also grasp the condition of the battery 50, e.g., SOC (State of Charge) based on a voltage value of the battery 50 output from the voltage measuring part 152, a current value output from the current measuring part 153, and a temperature of the battery 50 output from the temperature measuring part 154. The battery control part 151 also serves to avoid overload of the battery 50.

The battery control part 151 also serves as a charge/discharge hysteresis value calculating part for calculating a charge hysteresis value Cc and a discharge hysteresis value Cd and a current limiting part for performing the current limiting. These operations will be described in detail later. The memory 151 has stored set values of charge threshold current Ic and discharge threshold current Id to be used for calculation of the charge hysteresis value Cc and the discharge hysteresis value Cd. Accordingly, the battery control part 151 can appropriately read set values of charge threshold current Ic and discharge threshold current Id from the memory 155.

(Basic Operation)

A basic operating mode of the hybrid vehicle 1 and the hybrid system 10 will be explained below. The hybrid vehicle 1 is driven to run by the hybrid system 10 including two types of power sources, i.e., the engine 20 and the electric motor 30. A driving manner using the hybrid system 10 includes a running mode using only the engine 20 as the drive source, a running mode using only the electric motor 30 as the drive source, and a running mode using both the engine 20 and the electric motor 30 as the drive source. These running modes are further subdivided according to a charged state and a discharged state of the battery 50. By selectively using the running modes, the hybrid vehicle 1 having high energy efficiency and low fuel consumption can be achieved. Therefore typical running modes will be explained below.

At start, the hybrid vehicle 1 is driven to run by only the electric motor 30. This is because the motor can generate large torque even at rotation start time. At low-speed running, the hybrid vehicle 1 is driven by only the electric motor 30. Because the driving efficiency by the engine 20 is low at start and at low-speed running.

At normal running, both the engine 20 and the electric motor 30 are used in combination as a drive source. At that time, the engine 20 and the electric motor 30 are driven so that the PCU 200 keeps optimal energy efficiency in response to operation signals from the accelerator pedal and others.

At rapid acceleration, the vehicle 1 runs by use of the engine 20 and the electric motor 30 in combination, so that larger electric power is supplied from the battery 50 to the motor 30 to make strong acceleration. On the other hand, at braking such as decelerating, the electric motor 30 is used as a power generator to generate power so that the thus generated electricity is collected by the battery 50.

In the above driving control, the PCU 200 commands electric power supply from the battery 50 to the motor 30. The PCU 200 also performs the current limiting in order to prevent an increase in internal resistance of each battery cell due to high-rate charge and discharge. A current limiting method in such a case will be explained later. On the other hand, the electric motor 30 and the power generator 40 appropriately generate electricity in each running mode to charge the battery 50 through the inverter 70.

Figure 3:
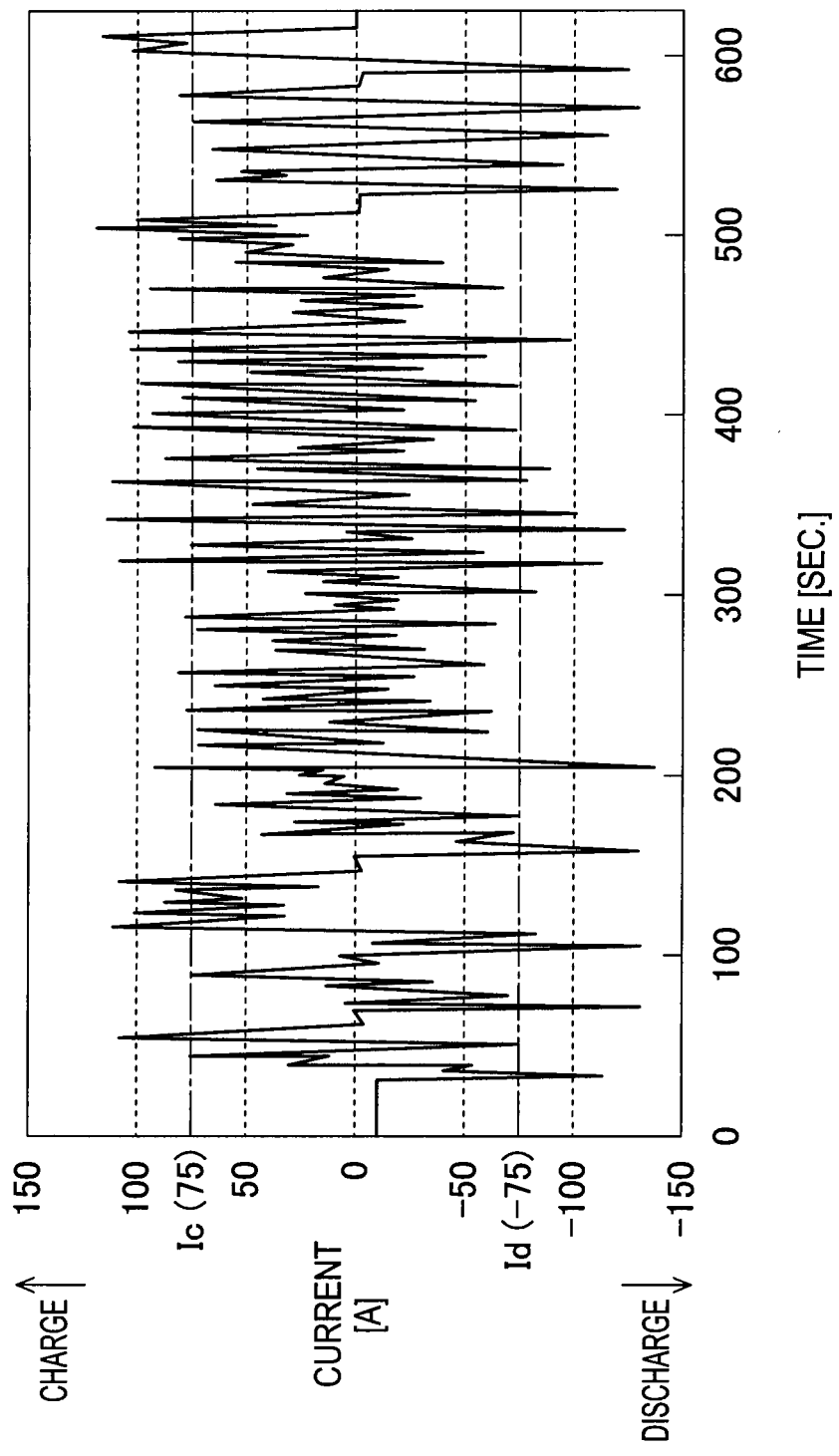
FIG. 3 is a graph showing changes over time in current value for charge and discharge of a battery during running of a hybrid vehicle.

According to the above running modes, the battery 50 repeats charge and discharge. One example of the repetition of charge and discharge is shown in FIG. 3 illustrating changes over time in current value I(t) of the battery 50 measured by the current measuring part 153. In FIG. 3, a lateral axis represents Time [sec.] and a vertical axis represents Current [A]. A positive current value indicates that charge is being conducted and a negative current value indicates that discharge is being conducted. This current value frequently changes. Specifically, the PCU 200 achieves optimal running of the hybrid vehicle 1 mounting the hybrid system 10 in response to the operation signals from the accelerator, the brake, the shift lever, and others. In the present embodiment, the battery system 100 limits the current of the battery 50 for charge and discharge with a large current in various running modes. This is to prevent a salt concentration distribution from becoming uneven, as mentioned later. Thus, the current limiting method will be explained below.

(Current Limiting Method)

The current limiting method in the battery system 100 in the present embodiment will be explained. The battery system 100 in the present embodiment is arranged to limit the current for charge or discharge in order to avoid the unevenness of a salt concentration distribution resulting from the use at high-rate charge and discharge. In the control of the battery system 100, the current limiting is performed when a charge hysteresis value Cc and a discharge hysteresis value Cd mentioned below are compared and a difference between them is larger than a predetermined value.

The charge hysteresis value Cc is obtained by digitizing the history for a period in which a current value I(t) measured by the current measuring part 153 is equal to or larger than a value of a charge threshold current Ic (see FIG. 3) which is a previously set threshold. The discharge hysteresis value Cd is obtained by digitizing the history for a period in which the current value I(t) output from the current measuring part 153 is equal to or smaller than a value of a discharge threshold current Id (see FIG. 3) which is a previously set threshold.

Therefore, the charge hysteresis value Cc and the discharge hysteresis value Cd are defined in many variations. Some examples thereof are shown below. For comparison between those values, the charge hysteresis value Cc and the discharge hysteresis value Cd are both defined as positive values or zero by absolute values.

(First Example of Charge Hysteresis Value Cc and Discharge Hysteresis Value Cd)

When the current I(t) is positive, charge is performed. When the current I(t) is negative, discharge is conducted. Thus, the current I(t) can be discriminated between charge current I(t) and discharge current I(t). Specifically, the charge current I(t) represents a current during a period in which the current I(t) is positive and the discharge current I(t) represents a current during a period in which the current I(t) is negative.

Figure 4:
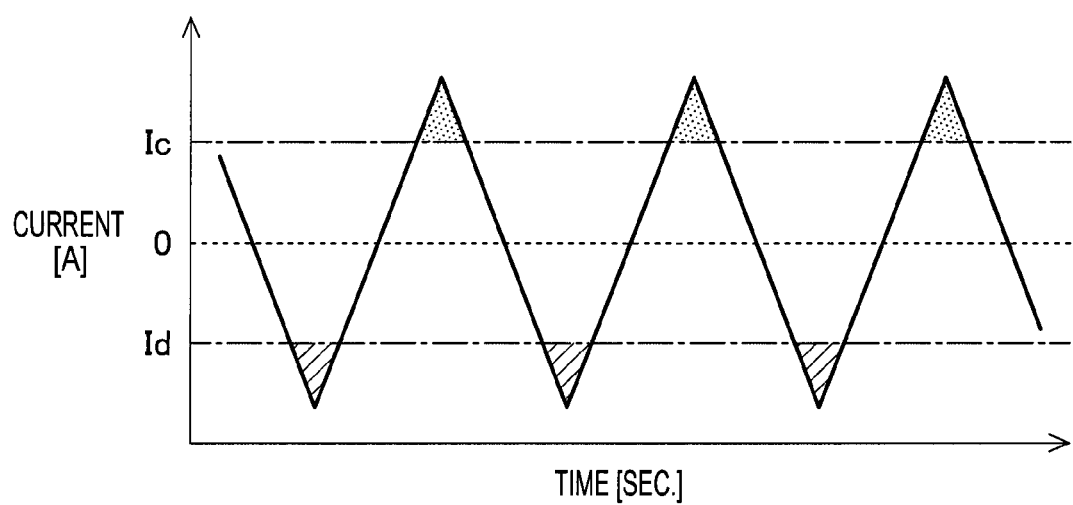
FIG. 4 is a graph showing charge hysteresis value Cc and discharge hysteresis value Cd in an embodiment.

As the charge hysteresis value Cc, an excess amount of the charge current I(t) exceeding the charge threshold current Ic, that is, an integral value of I(t)−Ic, can be used. The charge hysteresis value Cc of this example is defined by the following expression:

$$Cc = |\int [I(t) - Ic] dt| \quad (1)$$

where an integral interval is a time in which I(t)≥Ic is established. Thus, the charge hysteresis value Cc is a sum of integral values in the regions illustrated with a dot hatch pattern in FIG. 4. FIG. 4 shows a simplified form of the waveform of charge and discharge in FIG. 3.

As the discharge hysteresis value Cd, an excess amount of the discharge current I(t) exceeding the discharge threshold current Id, that is, an integral value of I(t)−Id, can be used. The discharge hysteresis value Cd of this example is defined by the following expression:

$$Cd = |\int [I(t) - Id] dt| \quad (2)$$

where an integral interval is a time in which I(t)≤Id is established. Thus, the discharge hysteresis value Cd is a sum of integral values in the regions illustrated with a slash hatch pattern in FIG. 4.

(Second Example of Charge Hysteresis Value Cc and Discharge Hysteresis Value Cd)

The charge hysteresis value Cc may be a time integration of the current I(t) itself for the time in which the charge current I(t) was larger than the charge threshold current Ic. The discharge hysteresis value Cd may also be an integral value of the current I(t) itself for the time in which the discharge current I(t) was larger than the discharge threshold current Id. In this example, the charge hysteresis value Cc and the discharge hysteresis value Cd are defined by the following expressions:

$$Cc = |\int I(t) dt| \quad (3)$$

where an integral interval is a time in which I(t)≥Ic is established, and $$Cd = |\int I(t) dt| \quad (4)$$

where an integral interval is a time in which I(t)≤Id is established.

(Third Example of Charge Hysteresis Value Cc and Discharge Hysteresis Value Cd)

The charge hysteresis value Cc may be a time Tc itself in which the charge current I(t) was larger than the charge threshold current Ic. The discharge hysteresis value Cd may also be a time Td itself in which the discharge current I(t) was larger than the discharge threshold current Id. In this example, the charge hysteresis value Cc and the discharge hysteresis value Cd are defined by the following expressions:

$$Cc = Tc = \int dt \quad (5)$$

where an integral interval is a time in which I(t)≥Ic is established, and $$Cd = Td = \int dt \quad (6)$$

where an integral interval is a time in which I(t)≤Id is established.

(Forth Example of Charge Hysteresis Value Cc and Discharge Hysteresis Value Cd)

Furthermore, the charge hysteresis value Cc may be a value obtained by multiplying the time Tc in which the charge current I(t) was larger than the charge threshold current Ic by a value of the charge threshold current Ic. The discharge hysteresis value Cd also may be a value obtained by multiplying the time Td in which the discharge current I(t) was larger than the discharge threshold current Id by a value of the discharge threshold current Id. In this example, the charge hysteresis value Cc and the discharge hysteresis value Cd are defined by the following expressions.

$$Cc = |Ic| \cdot Tc \quad (7)$$

$$Cd = |Id| \cdot Td \quad (8)$$

(Fifth Example of Charge Hysteresis Value Cc and Discharge Hysteresis Value Cd)

The charge hysteresis value Cc may be a value obtained by multiplying the time Tc in which the charge current I(t) was larger than the charge threshold current Ic by a maximum current value "Imax" within a measuring time. The discharge hysteresis value Cd also may be a value obtained by multiplying the time Td in which the discharge current I(t) was larger than the discharge threshold current Id by a minimum current value "Imin" within the measuring time. In this example, the charge hysteresis value Cc and the discharge hysteresis value Cd are defined by the following expressions:

$$Cc = |Imax| \cdot Tc \quad (9)$$

where Imax: a maximum current value within the measuring time, and $$Cd = |Imin| \cdot Td \quad (10)$$

where Imin: a minimum current value within the measuring time.

As explained above, the charge hysteresis value Cc is a value obtained by digitizing the charge history for the period Tc which is a current value equal to or larger than the charge threshold current Ic. Similarly, the discharge hysteresis value Cd is a value obtained by digitizing the discharge history for the period Td which is a current value equal to or smaller than the discharge threshold current Id.

The current limiting method using the charge hysteresis value Cc and the discharge hysteresis value Cd is explained below referring to a flowchart in FIG. 5. Measurement is first started (S101). The measurement period at that time is for example a period of time from turn-ON to turn-OFF of an ignition key. The measurement is started at the turn-ON and is stopped at the turn-OFF. This period may alternatively be a predetermined length of time such as 1 minute or 1 hour. Successively, values of the charge threshold current Ic (see FIG. 3) and the discharge threshold current Id (see FIG. 3) are read from the memory 155 (S102). The charge threshold current Ic and the discharge threshold current Id are current values having been determined in advance. FIG. 3 exemplifies changes over time in current for charge and discharge in the battery 50 and the charge threshold current Ic and the discharge threshold current Id. This shows that charge is being conducted for a period in which the measured current I(t) is a positive value and discharge is being conducted for a period in which the measured current I(t) is a negative value.

In FIG. 3, the charge threshold current Ic is indicated as 75 A and the discharge threshold current Id is indicated as −75 A.

Subsequently, the charge/discharge hysteresis value calculating part calculates the charge hysteresis value Cc and the discharge hysteresis value Cd (S103). The charge hysteresis value Cc is obtained by one of the aforementioned expressions (1), (3), (5), (7), and (9). The discharge hysteresis value Cd is obtained by one of the aforementioned expressions (2), (4), (6), (8), and (10). The charge hysteresis value Cc and the discharge hysteresis value Cd are continuously measured up to the termination of measurement in S104 (S104). Although the charge hysteresis value Cc and the discharge hysteresis value Cd are calculated at the same time as measurement of the current value I(t), the charge hysteresis value Cc and the discharge hysteresis value Cd may be calculated simultaneously after the termination of measurement.

The charge hysteresis value Cc and the discharge hysteresis value Cd are compared with each other (S105). If the charge hysteresis value Cc is larger than the discharge hysteresis value Cd (S105: Yes), the current limiting part limits a current value on the charge side (S106). On the other hand, if the charge hysteresis value Cc is equal to or smaller than the discharge hysteresis value Cd (S105: No), the current limiting part limits a current value on the discharge side (S107). The current limiting (S106, S107) at this time is applied in a next measurement time.

Figure 5:
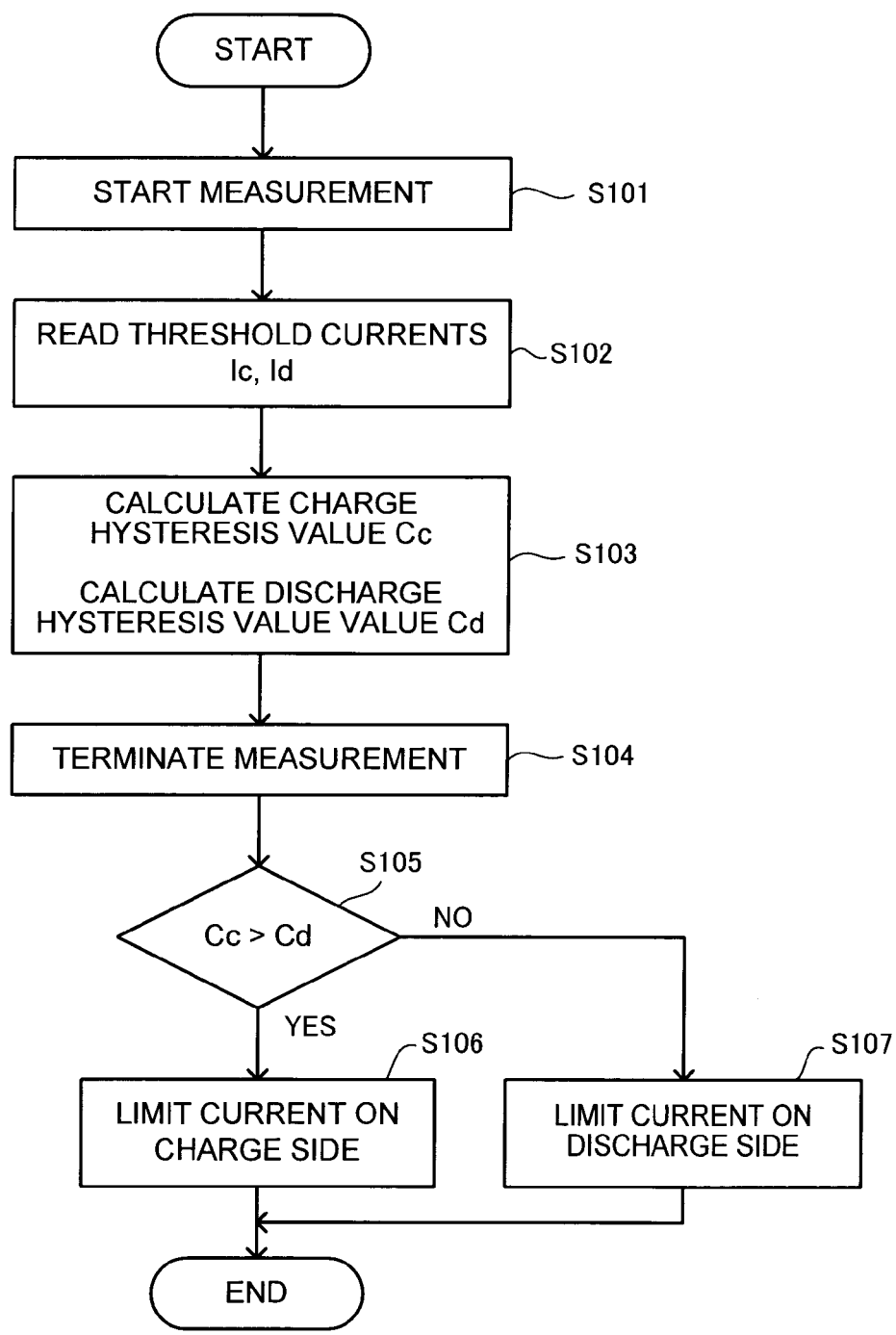
FIG. 5 is a flowchart to explain current control of the battery system in a first embodiment.

This current limiting is performed to reduce a difference between the charge hysteresis value Cc and the discharge hysteresis value Cd that are to be calculated in S103 of the current control flow in FIG. 5 to be executed in a next measurement period. For instance, the charge hysteresis value Cc and the discharge hysteresis value Cd calculated in S103 are recalculated on the assumption that the current limiting was performed. And, the condition of current limiting is set to make the charge hysteresis value Cc and the discharge hysteresis value Cd equal and can be applied in the next measurement period. Alternatively, a rank may be set in advance according to a difference (Cc−Cd) between the charge hysteresis value Cc and the discharge hysteresis value Cd so that the current limiting is performed according to a corresponding rank.

Figure 6:
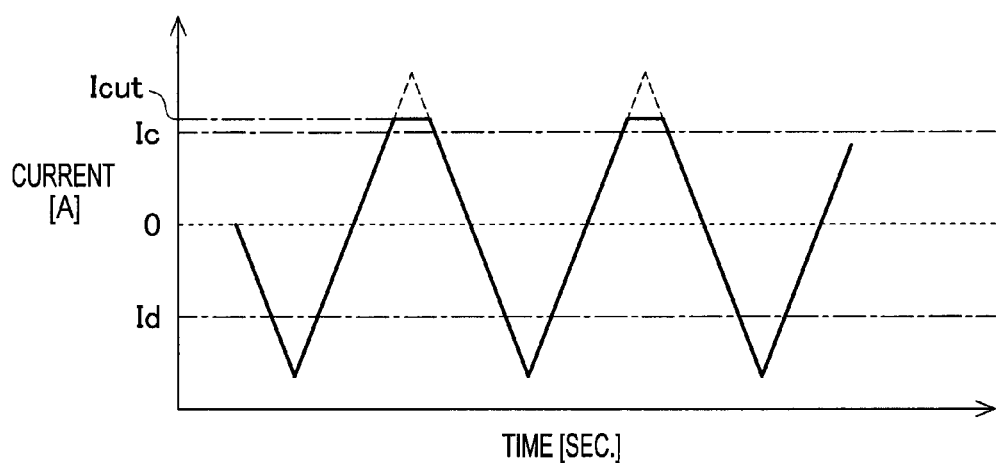
FIG. 6 is a graph (Part 1) to explain a current limiting method of the battery system according to the present invention.

A method of setting the current limiting to be executed by the current limiting part is explained below. FIG. 6 is a graph showing an example of setting the current limiting on the charge current side in S106. A broken line indicates a current value before the current limiting is performed. A solid line indicates a current value after the current limiting is performed. It is to be noted that, similar to FIG. 4, FIG. 6 shows a simplified form of the waveform in FIG. 3. The current limiting is conducted by cutting off the current larger than a threshold as shown in FIG. 6. Specifically, a limit threshold current "Icut" is set to prevent a current larger than the limit threshold current "Icut" from flowing. It is to be noted that the limit threshold current "Icut" is defined separately from the charge threshold current Ic. In S106, therefore, in the case where the current value obtained when no current limiting is assumed to have been performed exceeds the limit threshold current "Icut" which is a previously determined limit value, the limit threshold current "Icut" is caused to flow instead of that current value.

Figure 7:
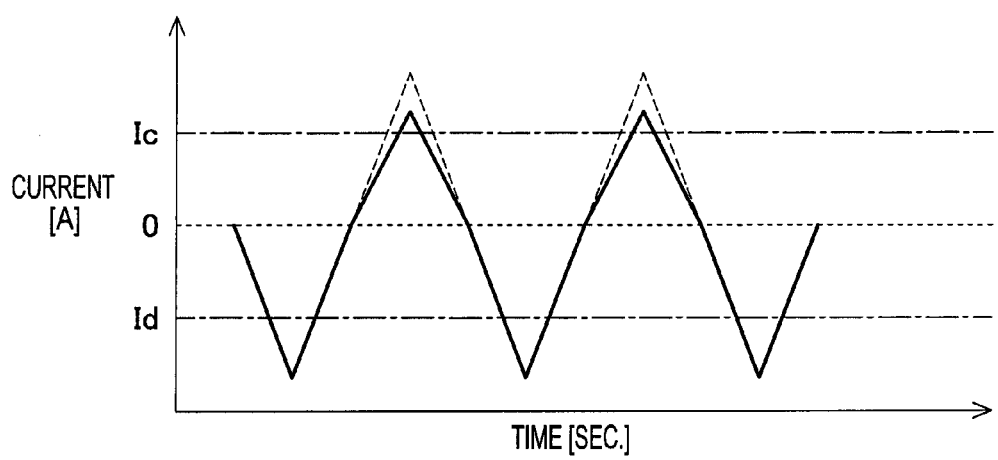
FIG. 7 is a graph (Part 2) to explain the current limiting method of the battery system according to the present invention.

FIG. 7 is a graph to explain a different current limiting method from FIG. 6. A broken line indicates a current value before the current limiting is performed. A solid line indicates a current value after the current limiting is performed. Similar to FIG. 4, FIG. 7 also shows a simplified form of the waveform in FIG. 3. The current limiting may be conducted by entirely reducing output as shown in FIG. 7. For example, the output can be reduced by 5%. In this case, a current Ir(t) subjected to the current limiting is defined by using a coefficient δ smaller than 1:

$$Ir(t) = I(t) \cdot \delta$$

$$\delta < 1$$

where
  Ir(t): a current subjected to the current limiting,
  I(t): a current before subjected to the current limiting, and
  δ: a coefficient.

In other words, the current limiting part flows a current of a value obtained by multiplying the current value when the current limiting is assumed not to have been conducted by the predetermined coefficient smaller than 1.

In the case where the current value when the current limiting is assumed not to have been performed exceeds the limit threshold current "Icut" which is a predetermined limit value, alternatively, an excess amount of the current value exceeding the limit threshold current "Icut" may be multiplied by the predetermined coefficient smaller than 1. A resultant value is added with the limit threshold current "Icut". This calculated value may be used as a current after execution of the current limiting. Specifically, the current limiting is performed by flowing the current Ir(t) subjected to the current limiting defined by the following expression instead of the current I(t):

$$Ir(t) = [I(t) - Icut] \cdot \delta + Icut$$

$$\delta < 1$$

where
  Ir(t): a current subjected to the current limiting,
  I(t): a current before subjected to the current limiting,
  Icut: a limit threshold current, and
  δ: a coefficient.

As above, FIGS. 6 and 7 show the case where the current limiting is performed on the current on the charge side (S106). The same current limiting can also be conducted when the current limiting is to be performed on the current on the discharge side (S107). The current limiting may also be conducted by setting the limit threshold current "Icut" for charge and reducing the entire output for discharge. As another alternative, the current limiting may be performed by reducing the entire output for charge and setting the limit threshold current "Icut" for discharge.

Figure 8:
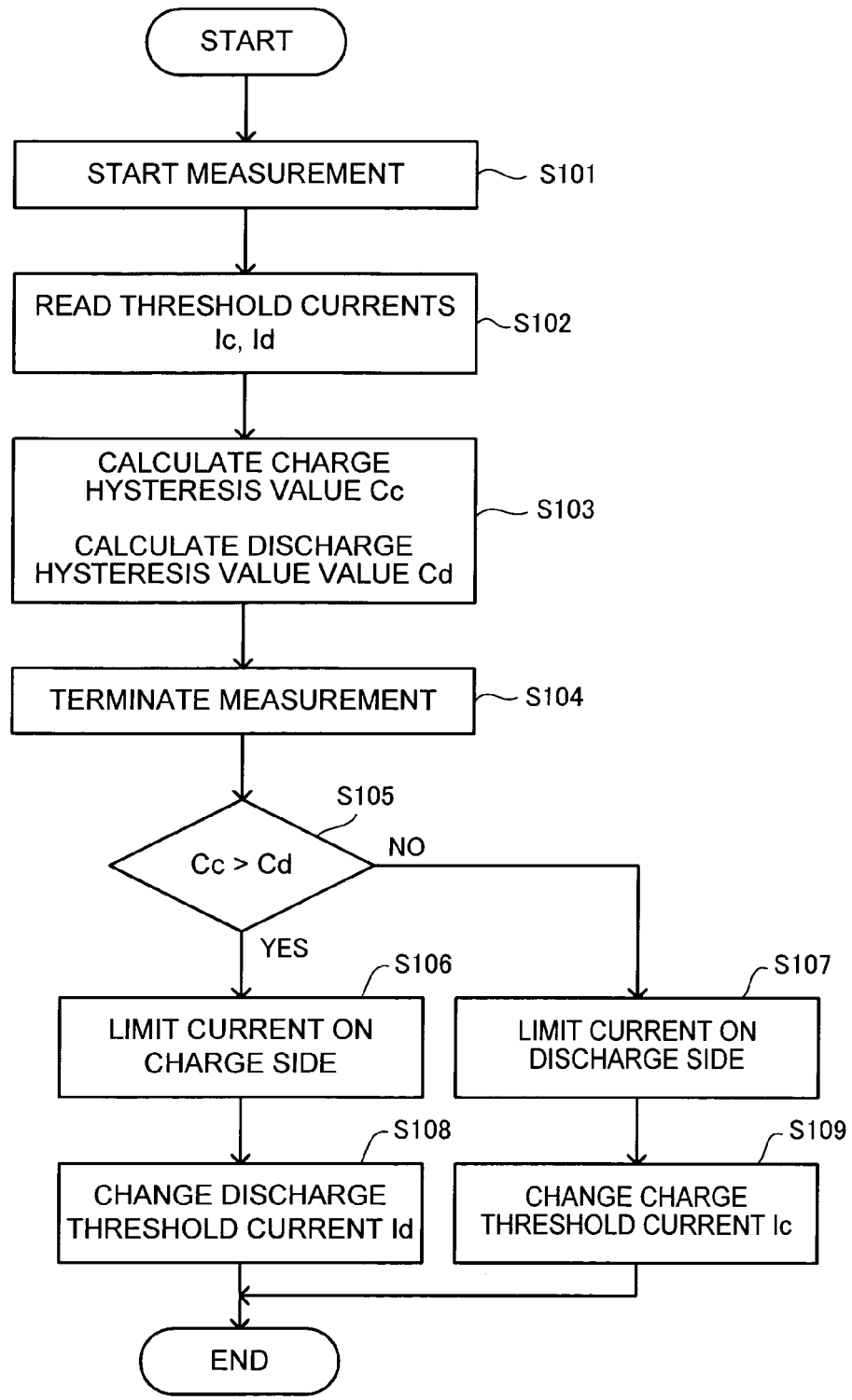
FIG. 8 is a flowchart to explain another current control of the battery system in the first embodiment.

A modified example of the present embodiment will be explained below. In the present embodiment, the charge threshold current Ic and the discharge threshold current Id are treated as constant values. Alternatively, the charge threshold current Ic and the discharge threshold current Id may be appropriately changed. For instance, as shown in FIG. 8, if the charge hysteresis value Cc is larger than the discharge hysteresis value Cd (S105: Yes), the current limiting on the charge side is performed in S106 and accordingly the discharge threshold current Id may be increased (S108). This setting is applicable from a next measurement period. Further, as shown in FIG. 8, if the charge hysteresis value Cc is equal to or smaller than the discharge hysteresis value Cd (S105: No), the current limiting on the discharge side is performed in S107 and accordingly the charge threshold current Ic may be increased (S109). This setting is also applicable from the next measurement period. In this case, the charge threshold current Ic(t) and the discharge threshold current Id(t) change over time.

As explained in detail above, the nonaqueous electrolyte type lithium ion secondary battery system in the present embodiment sets a current limiting on charge or discharge when the high-rate charge or discharge is continuously performed. This can prevent the salt concentration distribution from becoming uneven, preventing the increase in internal resistance. Thus, the battery system 100, hybrid system 10, and hybrid vehicle 1 can have a prolonged endurance life.

The present embodiment is a mere example and does not give any limitations to the present invention. Thus, the present invention may be embodied in other specific forms without departing from the essential characteristics thereof. For instance, the present invention is applicable to not only the nonaqueous electrolyte type lithium ion secondary battery but also another nonaqueous electrolyte type secondary battery in which an electrolyte has a higher viscosity than water and an ion diffusion velocity is low.

The running modes of the hybrid vehicle are mere examples and are not limited to the aforementioned ones. In the above embodiment, the nonaqueous electrolyte type lithium ion secondary battery is applied to the hybrid vehicle but not limited to the hybrid vehicle. In other words, it may be used in other vehicles such as an electric vehicle and a fuel battery car. The present embodiment uses the charge threshold current Ic and the discharge threshold current Id but may use thresholds for electric power instead. The current limiting flow in the above embodiment is repeated in every measurement period. As an alternative, after the charge hysteresis value Cc and the discharge hysteresis value Cd are measured once, such measurement is not conducted again and the same current limiting is applied continuously.

Second Embodiment

A second embodiment will be explained. A hybrid vehicle 1, a hybrid system 10, a PCU 200, and a battery system 100 in this embodiment have the same mechanical structures as those in the first embodiment. A different point from the first embodiment is in a current limiting method. In the first embodiment, the current limiting is surely performed on either charge current or discharge current. However, if a difference between a charge hysteresis value Cc and a discharge hysteresis value Cd is small, the current limiting does not always have to be performed. In the present embodiment, therefore, the current limiting is performed neither on charge current nor on discharge current if the difference between the charge hysteresis value Cc and the discharge hysteresis value Cd is small.

Figure 9:
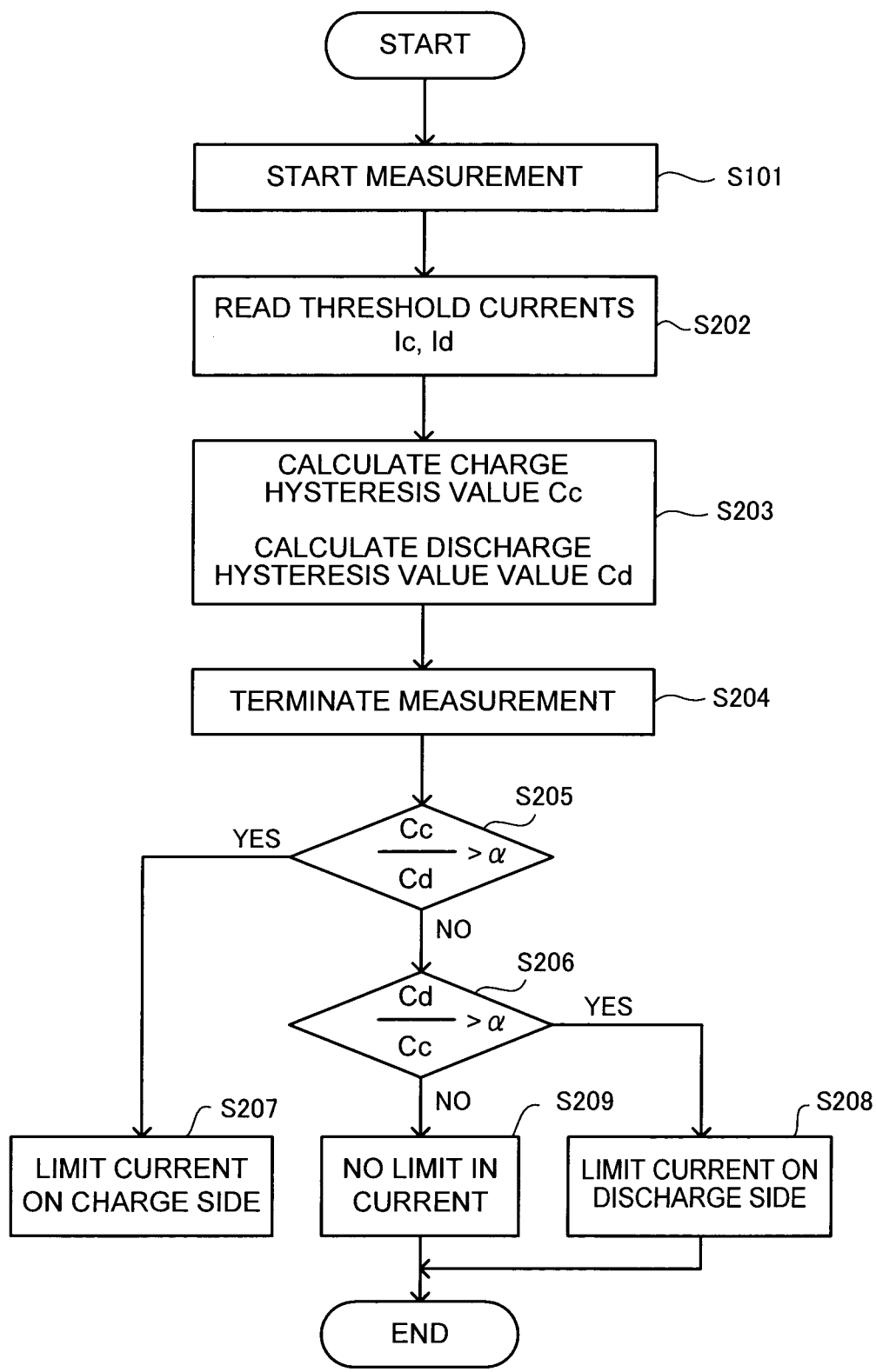
FIG. 9 is a flowchart to explain current control of a battery system in a second embodiment.

The current limiting method in the present embodiment will be explained by referring to a flowchart in FIG. 9. Time measurement is first started (S201). The measuring time may be a previously set time or a time from turn-ON to turn-OFF of an ignition key as in the first embodiment. Successively, a charge threshold current Ic and a discharge threshold current Id are read (S202). Then, a charge hysteresis value Cc and a discharge hysteresis value Cd are calculated (S203). The charge hysteresis value Cc and the discharge hysteresis value Cd calculated herein include several variations as in the first embodiment. One of those variations is selected. The time measurement is then terminated (S204).

Subsequently, the charge hysteresis value Cc and the discharge hysteresis value Cd are compared (S205). If a ratio of the charge hysteresis value Cc to the discharge hysteresis value Cd is larger than a predetermined reference value α (S205: Yes):

$$Cc/Cd > \alpha$$

the current limiting on the charge side is performed (S207). If not (S205: No), the flow goes to S206. Next, a ratio of the discharge hysteresis value Cd to the charge hysteresis value Cc is larger than the reference value α (S206: Yes):

$$Cd/Cc > \alpha$$

the current limiting on the discharge side is performed (S208). If not (S206: No), the current limiting is not conducted (S209). The current limiting to be performed herein is the same as that in the first embodiment. The above operation is repeated at regular intervals.

The reference value α used herein is a number equal to or larger than 1 ($\alpha \geq 1$). For example, a numeric value such as 1.2 may be used. Accordingly, if the charge hysteresis value Cc is too large as compared with the discharge hysteresis value Cd (S205: Yes), the current limiting on the charge side is performed (S207). To the contrary, if the charge hysteresis value Cc is too small as compared with the discharge hysteresis value Cd (S206: Yes), the current limiting on the discharge side is performed (S208). If neither case is true (S206: No), the current limiting is not performed (S209).

A modified example of the present embodiment is explained below. If the charge hysteresis value Cc is a value equal to or larger than a sum of the discharge hysteresis value Cd and a predetermined reference value β (S205: Yes):

$$Cc \geq Cd + \beta$$

the current limiting on the charge side may be performed (S207). If the discharge hysteresis value Cd is a value equal to or larger than a sum of the charge hysteresis value Cc and the predetermined reference value β (S206: Yes):

$$Cd \geq Cc + \beta$$

the current limiting on the discharge side may be performed (S208). Herein, β is a positive number. The reference values α and β are common between S205 and S206. As an alternative, different values between S205 and S206 may be used.

As explained in detail above, the nonaqueous electrolyte type lithium ion secondary battery system in the present embodiment sets the current limiting on charge or discharge when the high-rate charge or discharge is continuously performed. This can prevent the salt concentration distribution from becoming uneven, preventing an increase in internal resistance. Thus, the battery system 100, hybrid system 10, and hybrid vehicle 1 can have a prolonged endurance life.

The present embodiment is a mere example and does not give any limitations to the present invention. Thus, the present invention may be embodied in other specific forms without departing from the essential characteristics thereof. For instance, the present invention is applicable to not only the nonaqueous electrolyte type lithium ion secondary battery but also another nonaqueous electrolyte type secondary battery in which an electrolyte has a higher viscosity than water and an ion diffusion velocity is low.

The running modes of the hybrid vehicle are mere examples and are not limited to the aforementioned ones. In the above embodiment, the nonaqueous electrolyte type lithium ion secondary battery is applied to the hybrid vehicle but not limited to the hybrid vehicle. In other words, it may be used in other vehicles such as an electric vehicle and a fuel battery car. The present embodiment uses the charge threshold current Ic and the discharge threshold current Id but may use thresholds for electric power instead. The current limiting flow in the above embodiment is repeated in every measurement period. As an alternative, after the charge hysteresis value Cc and the discharge hysteresis value Cd are measured once, such measurement is not performed again and the same current limiting is applied continuously.

Third Embodiment

A third embodiment will be explained below. A hybrid vehicle 1, a hybrid system 10, a PCU 200, and a battery system 100 in this embodiment have the same mechanical structures as those in the first embodiment. A different point from the first embodiment is in a current limiting method. In the first embodiment, the current limiting is performed by use of the charge hysteresis value Cc and the discharge hysteresis value Cd. In the present embodiment, the current limiting is conducted by use of an accumulated charge hysteresis value SCc and an accumulated discharge hysteresis value SCd in addition to the charge hysteresis value Cc and the discharge hysteresis value Cd.

The accumulated charge hysteresis value SCc is obtained by cumulatively adding the charge hysteresis values Cc measured for predetermined times after manufacture of the hybrid vehicle 1 up to a present time (a measuring time). In other words, the accumulated charge hysteresis value SCc is a value calculated by adding the currently calculated charge hysteresis value Cc to the sum total of the charge hysteresis values Cc calculated in the previous measurement times. The accumulated discharge hysteresis value SCd is obtained by cumulatively adding the discharge hysteresis values Cd measured for a predetermined times after manufacture of the hybrid vehicle 1 up to the present time (the measuring time). In other words, the accumulated hysteresis value SCd is a value calculated by adding the current calculated discharge hysteresis value Cd to the sum total of the discharge hysteresis values Cd calculated in the previous measurement time.

Accordingly, the accumulated charge hysteresis value SCc and the accumulated discharge hysteresis value SCd are defined by the following expressions.

$$SCc = \Sigma Cc$$

$$SCd = \Sigma Cd$$

Herein, the summing is performed after manufacture of the hybrid vehicle 1 up to the present time (the measuring time).

Figure 10:
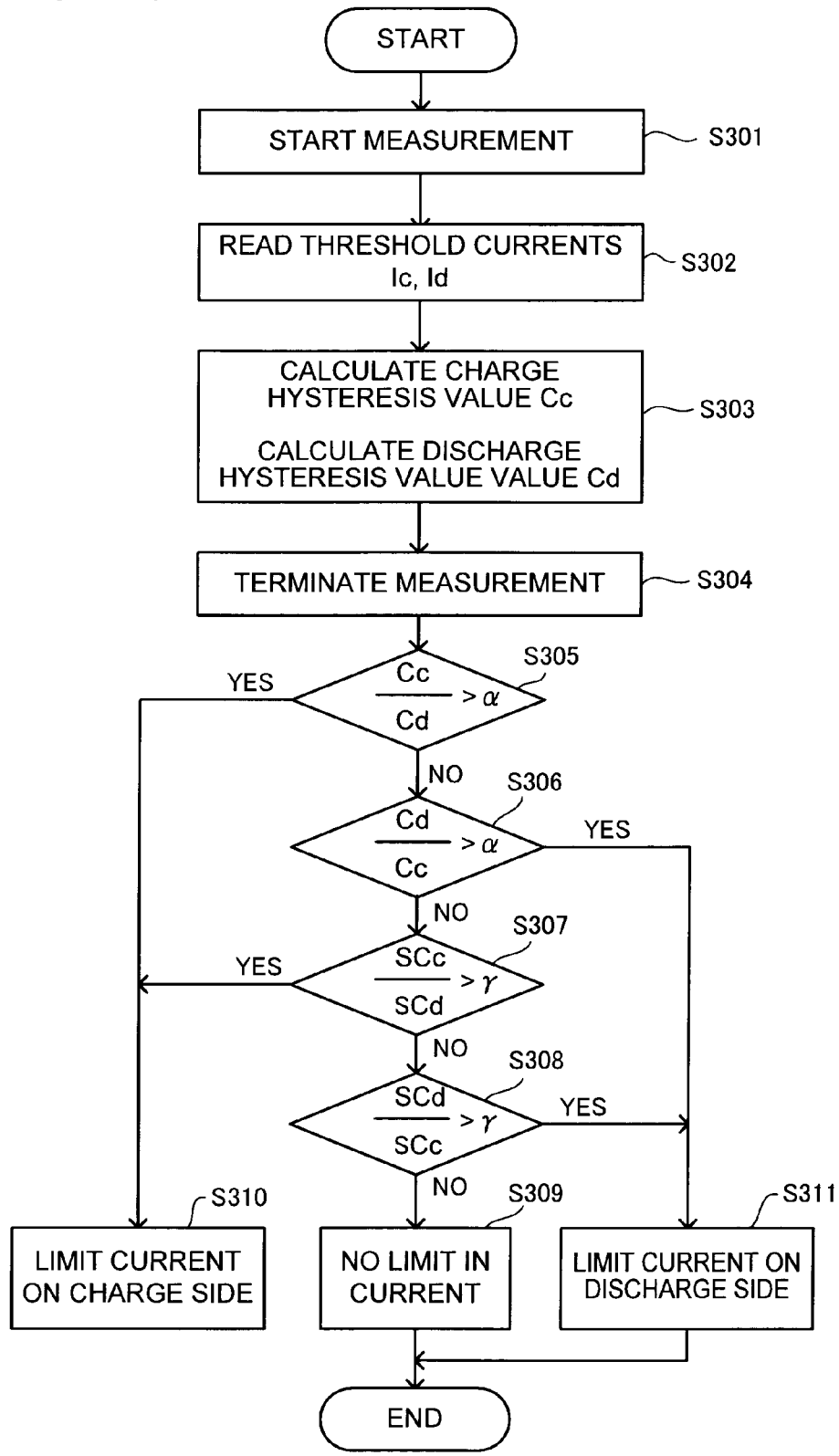
FIG. 10 is a flowchart to explain current control of a battery system in a third embodiment.

One example of the current limiting method in this embodiment will be explained by referring to a flowchart in FIG. 10. Time measurement is first started (S301). The measuring time may be a predetermined time or a time from turn-ON to turn-OFF of an ignition key as in the first embodiment. Successively, a charge threshold current Ic and a discharge threshold current Id are read (S302). Then, a charge hysteresis value Cc and a discharge hysteresis value Cd are calculated (S303). Simultaneously, an accumulated charge hysteresis value SCc and an accumulated discharge hysteresis value SCd are calculated. The charge hysteresis value Cc and the discharge hysteresis value Cd calculated herein include several variations as in the first embodiment. One of those variations is selected. The time measurement is then terminated (S304).

Successively, the charge hysteresis value Cc and the discharge hysteresis value Cd are compared (S305). If a ratio of the charge hysteresis value Cc to the discharge hysteresis value Cd is larger than a predetermined reference value α (S305: Yes):

$$Cc/Cd > \alpha$$

the current limiting on the charge side is performed (S310). If not (S305: No), the flow goes to S306. Herein, α is 1 or a larger value. Next, a ratio of the discharge hysteresis value Cd to the charge hysteresis value Cc is larger than the reference value α (S306: Yes):

$$Cd/Cc > \alpha$$

the current limiting on the discharge side is performed (S311). If not (S306: No), the flow goes to S307.

In S307, the accumulated charge hysteresis value SCc calculated by adding the charge hysteresis values Cc for the time from manufacture of the hybrid vehicle 1 up to S304 is compared with the accumulated discharge hysteresis value SCd calculated by adding the discharge hysteresis values Cd for the time from manufacture of the hybrid vehicle 1 up to S304. Herein, the accumulated charge hysteresis value SCc and the accumulated discharge hysteresis value SCd are defined by the following expressions:

$$SCc = \Sigma Cc$$

$$SCd = \Sigma Cd$$

where the summing is performed for a period after manufacture up to S304. It is to be noted that the summing in the aforementioned expressions is conducted for a period from manufacture to S304. As an alternative, the accumulated charge hysteresis value SCc and the accumulated discharge hysteresis value SCd may be reset at the time of replacement of the battery 50.

In S307, if the ratio of the accumulated charge hysteresis value SCc to the accumulated discharge hysteresis value SCd is $$SCc/SCd > \gamma$$

(S307: Yes), the current limiting on the charge side is performed (S310). If not (S307: No), the flow goes to S308. Herein, γ is a number equal to or larger than 1.

In S308, the ratio of the accumulated discharge hysteresis value SCd to the accumulated charge hysteresis value SCc is $$SCd/SCc > \gamma$$

(S308: Yes), the current limiting on the discharge side is performed (S311). If not (S308: No), the flow goes to S309. In S309, the current limiting current limiting is not conducted on the charge side nor on the discharge side. The current limiting to be performed herein is the same as that in the first embodiment. The above routine is repeated at regular intervals.

As mentioned above, the reference values α and γ are numbers equal to or larger than 1. For example, a numeric value such as 1.2 may be used. Accordingly, if the charge hysteresis value Cc is too large as compared with the discharge hysteresis value Cd, the current limiting on the charge side is performed. To the contrary, if the charge hysteresis value Cc is too small as compared with the discharge hysteresis value Cd, the current limiting on the discharge side is performed. If neither case is true, the current limiting is not performed.

Even if the difference between the charge hysteresis value Cc and the discharge hysteresis value Cd is small, the current limiting is preferably conducted if a large difference occurs between the accumulated charge hysteresis value SCc and the accumulated discharge hysteresis value SCd representing the history in the previous measurement time. The present embodiment is effective in such a case.

A modified example of the present embodiment will be explained below. If the charge hysteresis value Cc is a value equal to or larger than a sum of the discharge hysteresis value Cd and a predetermined reference value β:

$$Cc \geq Cd + \beta$$

the current limiting on the charge side may be conducted (S310). If the discharge hysteresis value Cd is a value equal to or larger than a sum of the charge hysteresis value Cc and the predetermined reference value β:

$$Cd \geq Cc + \beta$$

the current limiting on the discharge side may be performed (S311). The same applies to the accumulated charge hysteresis value SCc and the accumulated discharge hysteresis value SCd. β is a positive number.

Instead of using the charge hysteresis value Cc and the accumulated charge hysteresis value SCc, a plurality of the charge hysteresis values Cc defined by the aforementioned expressions (1), (3), (5), (7), and (9) may be used. Similarly, instead of using the discharge hysteresis value Cd and the accumulated discharge hysteresis value SCd, a plurality of the discharge hysteresis values Cd defined by the aforementioned expressions (2), (4), (6), (8), and (10) may be used.

As explained in detail above, the nonaqueous electrolyte type lithium ion secondary battery system in the present embodiment sets the current limiting on charge or discharge when the high-rate charge or discharge is continuously performed. This can prevent the salt concentration distribution from becoming uneven, preventing an increase in internal resistance. Thus, the battery system 100, hybrid system 10, and hybrid vehicle 1 can have a prolonged endurance life.

The present embodiment is a mere example and does not give any limitations to the present invention. Thus, the present invention may be embodied in other specific forms without departing from the essential characteristics thereof. For instance, the present invention is applicable to not only the nonaqueous electrolyte type lithium ion secondary battery but also another nonaqueous electrolyte type secondary battery in which an electrolyte has a higher viscosity than water and an ion diffusion velocity is low.

The running modes of the hybrid vehicle are mere examples and are not limited to the aforementioned ones. In the above embodiment, the nonaqueous electrolyte type lithium ion secondary battery is applied to the hybrid vehicle but not limited to the hybrid vehicle. In other words, it may be used in other vehicles such as an electric vehicle and a fuel battery car. The above embodiment uses the charge threshold current Ic and the discharge threshold current Id but may use thresholds for electric power instead. The current limiting flow in the above embodiment is repeated in every measurement period. As an alternative, after the charge hysteresis value Cc and the discharge hysteresis value Cd are measured once, such measurement is not conducted again and the same current limiting is applied continuously.

Fourth Embodiment

A fourth embodiment will be explained below. A hybrid vehicle 1, a hybrid system 10, a PCU 200, and a battery system 100 in this embodiment have the same mechanical structures as those in the first embodiment. A different point from the first embodiment is in that different values are used as the charge threshold current Ic and the discharge threshold current Id under various environments. The various environments are the temperature and the SOC (State of Charge) of a battery cell. A current value apt to change a salt concentration distribution in an electrolyte is also changed according to even the SOC and the temperature of a battery cell.

The charge threshold current Ic and the discharge threshold current Id used in the present embodiment depend on the temperature and the SOCs of the battery cells. The values of the charge threshold current Ic and the discharge threshold current Id depending on the temperature and the SOCs of the battery cells are stored in the form of a battery temperature-SOC dependence map in the memory 155. Accordingly, the battery control part 151 can read an optimal charge threshold current Ic and an optimal discharge threshold current Id based on the measured battery temperature and SOC. Based on that, the charge hysteresis value Cc and the discharge hysteresis value Cd are calculated as in the first and other embodiments. An after-mentioned method of setting the charge threshold current Ic and the discharge threshold current Id is used to create the battery temperature-SOC dependence map stored in the memory 155. The setting method of the charge threshold current Ic and the discharge threshold current Id is not an essential feature of the battery system 100, the hybrid system 10, and the hybrid vehicle 1.

Figure 11:
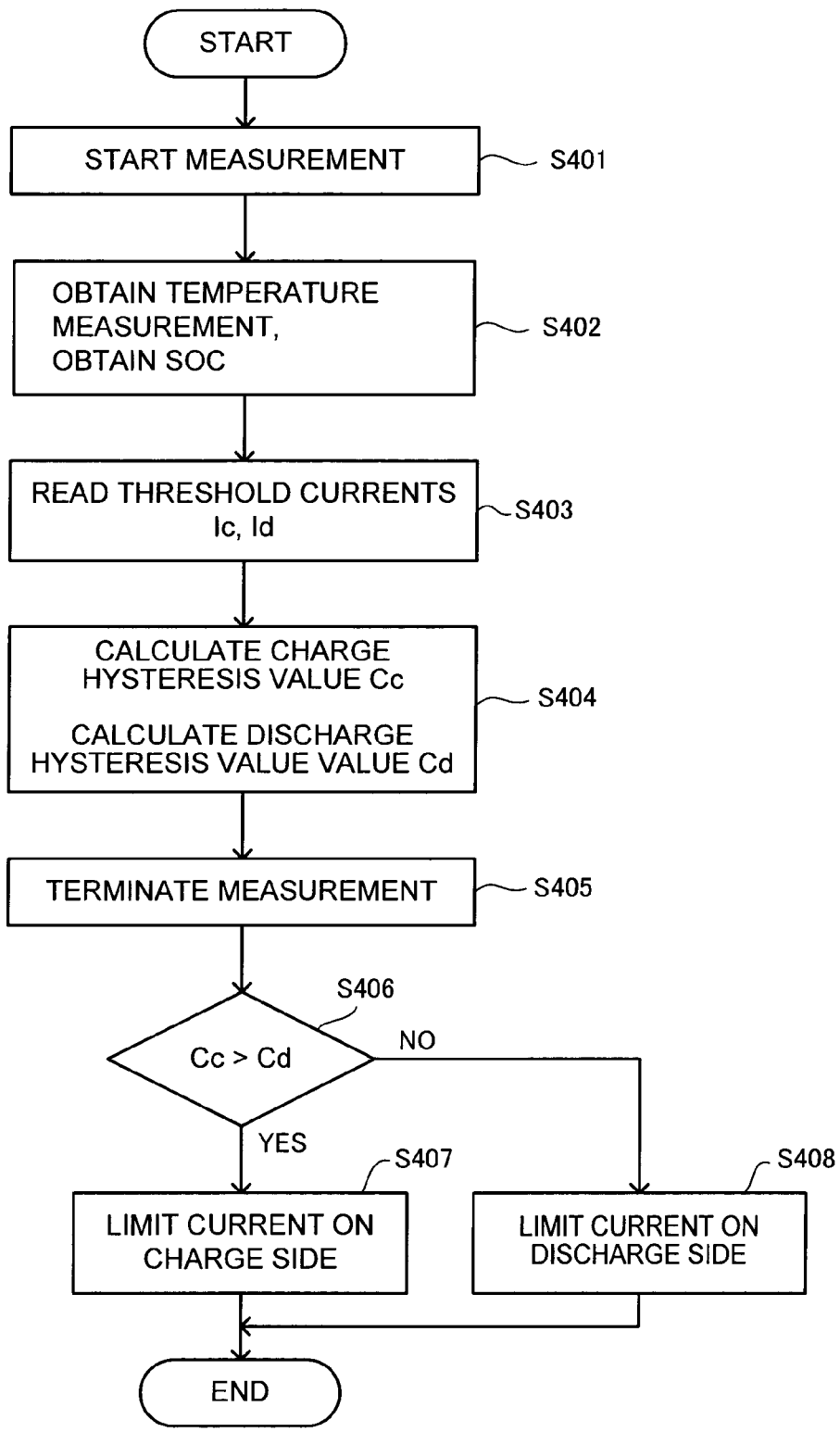
FIG. 11 is a flowchart to explain current control of a battery system in a fourth embodiment.

The current limiting method in the present embodiment will be explained referring to FIG. 11. Measurement is first started (S401). A temperature of each battery cell measured by the temperature measuring part 154 is obtained (S402). On the other hand, the SOC (State of Charge) is also obtained (S402). A value of the SOC is recorded at regular time intervals in the memory 155. Next, the charge threshold current Ic and the discharge threshold current Id are read from the battery temperature-SOC dependence map (S403). FIG. 12 is the battery temperature-SOC dependence map of the charge threshold current Ic. The obtained temperatures of the battery cells are averaged. Based on such a temperature average value and the SOC value, the charge threshold current Ic corresponding to that condition is read. FIG. 13 is the battery temperature-SOC dependence map of the discharge threshold current Id. Similarly, the discharge threshold current Id is read.

The charge hysteresis value Cc and the discharge hysteresis value Cd are then calculated (S404). The charge hysteresis value Cc and the discharge hysteresis value Cd are the same as those used in the first embodiment. The measurement is then terminated (S405). Successively, the charge hysteresis value Cc and the discharge hysteresis value Cd are compared with each other (S406). If the charge hysteresis value Cc is larger than the discharge hysteresis value Cd (S406: Yes), the current limiting on the charge side is performed (S407). If the charge hysteresis value Cc is equal to or lower than the discharge hysteresis value Cd (S406: No), the current limiting on the discharge side is performed (S408). As above, one cycle of the current limiting is terminated.

(Threshold Current)

In the present invention, it is important to perform charge and discharge while preventing the salt concentration distribution in the electrolyte of each battery cell from becoming uneven. Accordingly, it is preferable that the charge threshold current Ic and the discharge threshold current Id have a closer relation to changes in salt concentration distribution in the electrolyte. Therefore, the relationship between the intensity of current and the salt concentration distribution in the electrolyte is first explained.

In the case where charge or discharge with a large current is continuously conducted for a certain period, an electric charge transfer process occurs in which electric charges around the electrodes macroscopically move through the electrolyte. Successively, a diffusion process (a mass transfer process) occurs in which materials in the electrolyte move. When this mass transfer process occurs, the salt concentration distribution is considered to become uneven. Accordingly, the current limiting has to be performed to minimize the occurrence of the mass transfer process. If such a control as to cause no mass transfer process is performed, the output of the hybrid vehicle 1 may be insufficient or the energy coefficient may deteriorate. Thus, it is preferable to perform control to partly allow the use of battery cell whereby causing the mass transfer process in a range where the salt concentration distribution does not become uneven.

Figure 14:
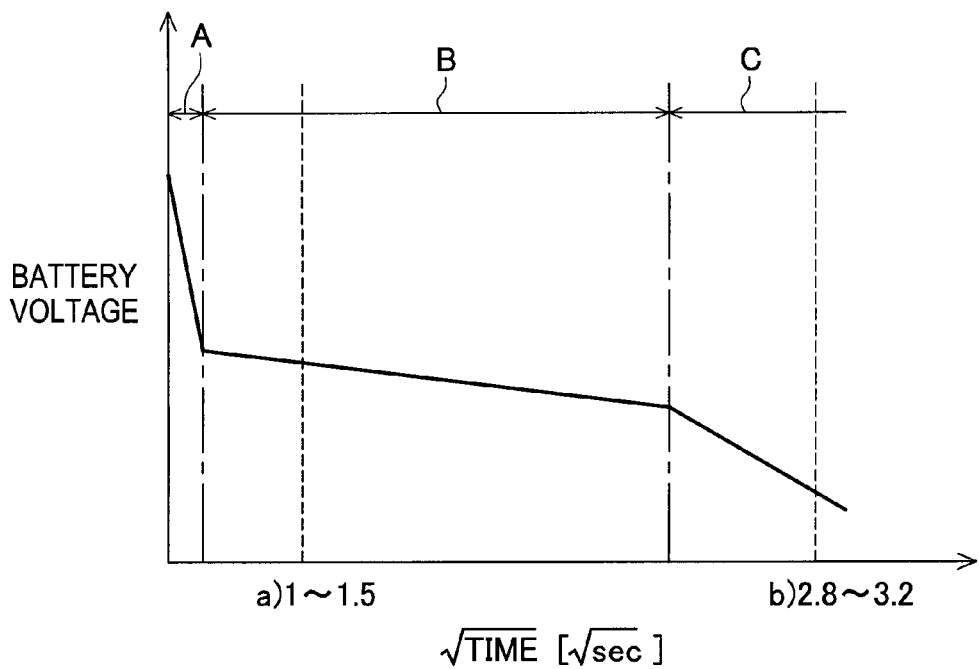
FIG. 14 is a graph to explain changes over time in voltage of a battery cell while discharge with a constant current is continued.

FIG. 14 is a graph showing characteristics of time changes in voltage of a battery cell when a constant current "Iconst" is continuously discharged. A lateral axis indicates a square root ($\sqrt{t}$) [$\sqrt{sec}$] of time "t". A horizontal axis indicates voltage [V] of the battery cell. The voltage of the battery cell continuously decreases from the start of discharge. In particular, immediately after the start of discharge, the voltage drastically decreases (Section A). Following the drastic decrease, the voltage slowly decreases (Section B). This section B is a range in which the charge transfer process is occurring. Then, the voltage more rapidly decreases (Section C) than in the section B. This section C is a range in which the mass transfer process (the diffusion process) is occurring. In the figure, a) indicates a region in which a value of the square root ($\sqrt{t}$) of the time "t" is 1 to 1.5. That is, it shows the time after a lapse of about 1 to 2 seconds from the start of discharge. In the figure, b) indicates a region in which a value of the square root ($\sqrt{t}$) of the time "t" is 2.8 to 3.2. That is, it shows the time after a lapse of about 9 to 10 seconds from the start of discharge.

Figure 15:
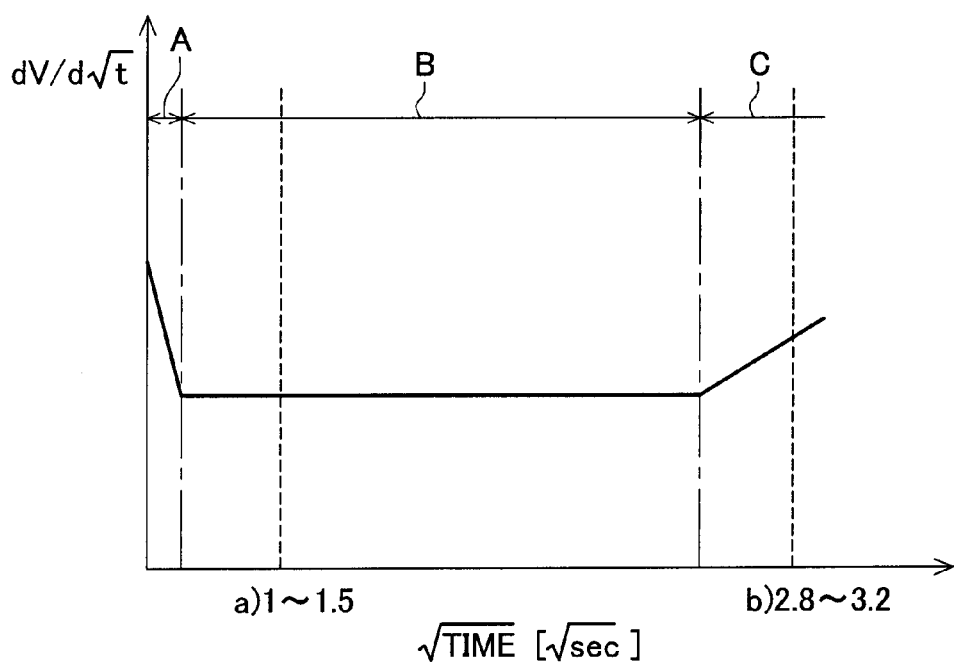
FIG. 15 is a graph to explain changes over time in value of $dV/d\sqrt{t}$ of the battery cell while the discharge with the constant current is continued.

FIG. 15 is a graph showing changes over time in value of $dV/d\sqrt{t}$ of the battery cell while it continues to discharge at a constant current "Iconst". A lateral axis represents a square root ($\sqrt{t}$) [$\sqrt{sec}$] of the time "t". A vertical axis represents a value of $dV/d\sqrt{t}$ of the battery cell. Sections A to C correspond to the sections A to C in FIG. 14. The $dV/d\sqrt{t}$ value is approximately a constant value in the charge transfer process (Section B). The $dV/d\sqrt{t}$ value increases in the mass transfer process (Section C) because ions (materials) are diffusing in the electrolyte in addition to electric charge transfer. Therefore, the estimation using the $dV/d\sqrt{t}$ value is appropriate to specify a shift from the electric charge transfer process (Section B) to the mass transfer process (Section C).

The relationship between a value of the square root $\sqrt{t}$ of the time "t" and the mass transfer process (the diffusion process) is defined by the following expression:

$$r^2 \propto D \cdot t$$

$$v_D \approx (dr/dt) \propto (D/t)^{1/2}$$

where
  r: Radius where particles exist,
  D: Diffusion coefficient,
  t: Time, and
  $V_D$: Diffusion velocity.

In other words, the diffusion velocity is inversely proportional to the square root $\sqrt{t}$ of the time "t". Thus, the voltage of the battery cell is estimated by the square root $\sqrt{t}$ of the time "t" instead of the time "t".

Figure 16:
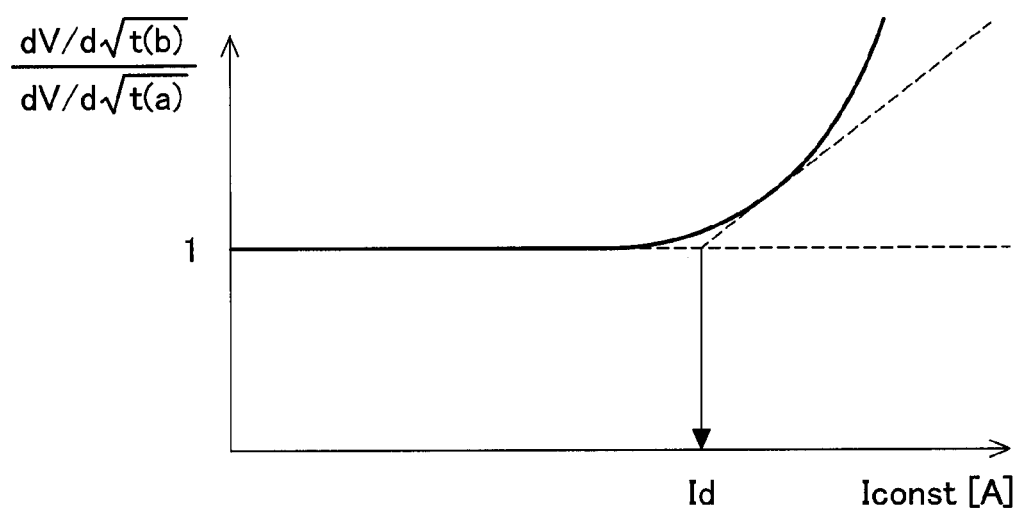
FIG. 16 is a graph showing change in value of $[dV/d\sqrt{t}(b)]/[dV/d\sqrt{t}(a)]$ when the constant current for continuing discharge is changed.

FIG. 16 is a graph to explain changes in value of $[dV/d\sqrt{t}(b)]/[dv/d\sqrt{t}(a)]$ when the constant current "Iconst" is changed. A value of $dV/d\sqrt{t}(a)$ falls within a range of the section B shown in FIGS. 14 and 15 even when the value "Iconst" is changed. On the other hand, the value of $dV/d\sqrt{t}(b)$ is in the section B while the value "Iconst" is small but the value of $dV/d\sqrt{t}(b)$ falls within a range of the section C (the diffusion process) when the value "Iconst" becomes larger. Specifically, when the value of $dV/d\sqrt{t}(b)$ is in the range of the section B, the value of $[dV/d\sqrt{t}(b)]/[dV/d\sqrt{t}(a)]$ is almost equal to 1. On the other hand, when the value of $dV/d\sqrt{t}(b)$ is in the range of the section C, the value of $[dV/d\sqrt{t}(b)]/[dV/d\sqrt{t}(a)]$ becomes larger than 1.

Accordingly, it is allowable that a current value at which the value of $[dV/d\sqrt{t}(b)]/[dV/d\sqrt{t}(a)]$ becomes larger than 1 is set as the discharge threshold current Id. However, the value of $[dV/d\sqrt{t}(b)]/[dV/d\sqrt{t}(a)]$ actually includes noise. Accordingly, when this value becomes larger than 1 by an amount corresponding to the noise, the value of $[dV/d\sqrt{t}(b)]/[dV/d\sqrt{t}(a)]$ is preferably set as Id. Alternatively, for example, a tangent line is drawn from a value at which $[dV/d\sqrt{t}(b)]/[dV/d\sqrt{t}(a)]$ reaches 1.5, and an intersecting point of that tangent line and $[dV/d\sqrt{t}(b)]/[dV/d\sqrt{t}(a)]=1$ can be set as the discharge threshold current Id.

As with the discharge threshold current Id, the charge threshold current Ic can also be calculated from the value of $[dV/d\sqrt{t}(b)]/[dV/d\sqrt{t}(a)]$ obtained when charge is conducted with the constant current.

When the battery temperature or the SOC changes, the graphs shown in FIGS. 14 to 16 vary accordingly. To be concrete, a current value at which the value of $dV/d\sqrt{t}(b)$ shifts from the section B (the charge transfer process) to the section C (the diffusion process) depends on the battery temperature and the SOC. In other words, the charge threshold current Ic and the discharge threshold current Id depend on the battery temperature and the SOC. Therefore, the temperature-SOC dependence map is used to obtain the charge threshold current Ic and the discharge threshold current Id corresponding to the changes in battery temperature and SOC.

Figure 17:
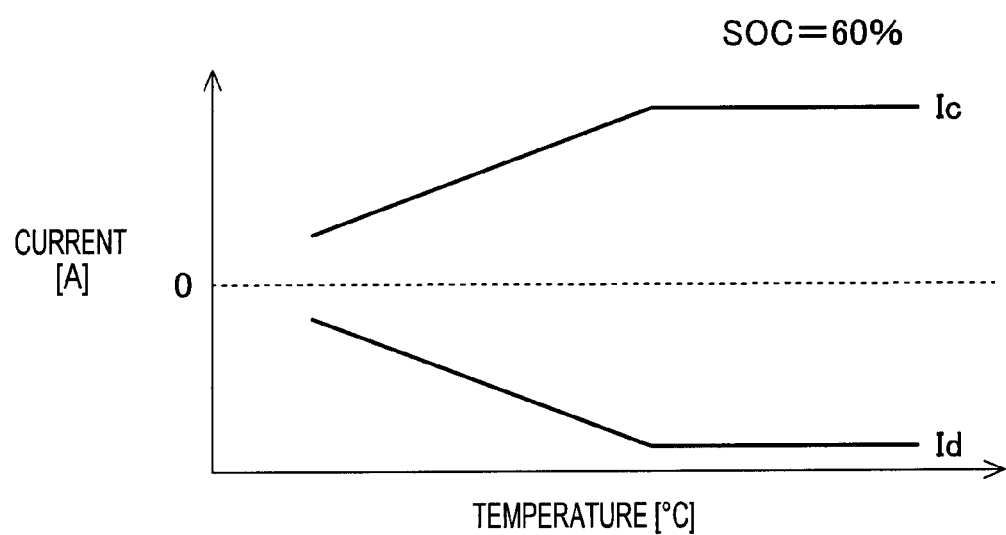
FIG. 17 is a graph showing an example of temperature dependence of a charge threshold current Ic and discharge threshold current Id under the condition that SOC is constant (60%)

FIG. 17 is a graph exemplifying the temperature dependence of the charge threshold current Ic and the discharge threshold current Id. FIG. 17 shows the temperature dependence of the charge threshold current Ic and the discharge threshold current Id when the SOC (State of Charge) is 60%. As the battery temperature is higher, an absolute value of the charge threshold current Ic is larger. As the battery temperature is lower, the absolute value of the charge threshold current Ic is smaller. Furthermore, as the battery temperature is higher, an absolute value of the discharge threshold current Id is larger. As the battery temperature is lower, the absolute value of the discharge threshold current Id is smaller. It is to be noted that as the battery temperature rises, change amounts of the charge threshold current Ic and the discharge threshold current Id decrease.

Figure 18:
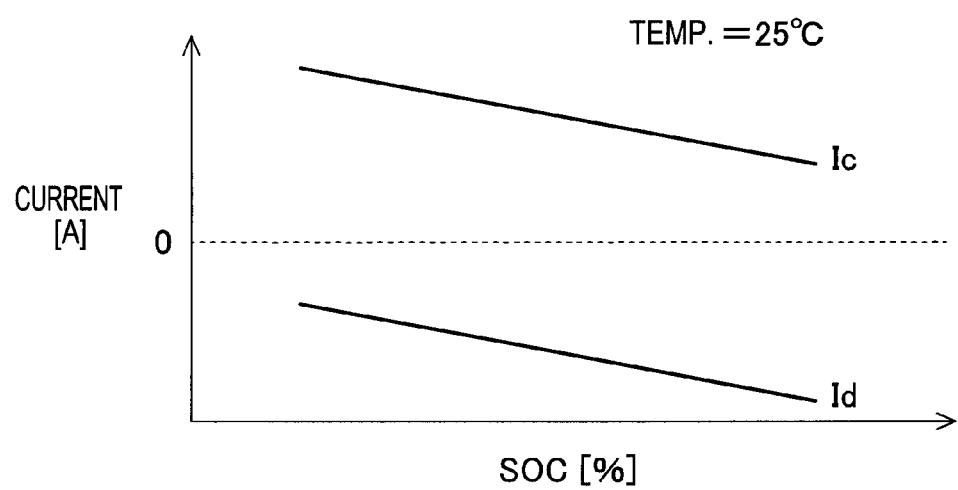
FIG. 18 is a graph showing an example of SOC dependence of a charge threshold current Ic and a discharge threshold current Id under the condition that temperature is constant (25° C.)

FIG. 18 is a graph showing the SOC dependence of the charge threshold current Ic and the discharge threshold current Id. FIG. 18 shows the SOC dependence of the charge threshold current Ic and the discharge threshold current Id when an average temperature of the battery cell is 25° C. As the SOC value is larger, the absolute value of the charge threshold current Ic is smaller. As the SOC value is smaller, the absolute value of the charge threshold current Ic is larger. Further, as the SOC value is larger, the absolute value of the discharge threshold current Id is larger. As the SOC value is smaller, the absolute value of the discharge threshold current Id is smaller.

As above, based on the temperature dependence shown in FIG. 17 and the SOC dependence shown in FIG. 18, the battery temperature-SOC dependence map of the charge threshold current Ic shown in FIG. 12 can be created. In the battery temperature-SOC dependence map in FIG. 12, while the temperature is constant (row component), the absolute value of the charge threshold current Ic is smaller as the SOC value is higher, and the absolute value of the charge threshold current Ic is larger as the SOC value is lower (see FIG. 18). While the SOC is constant (column component), the absolute value of the charge threshold current Ic is larger as the battery temperature is higher and the absolute value of the charge threshold current Ic is smaller as the battery temperature is lower (see FIG. 17).

Similarly, the battery temperature-SOC dependence map of the discharge threshold current Id shown in FIG. 13 can be created. In the battery temperature-SOC dependence map in FIG. 13, while the temperature is constant (row component), the absolute value of the discharge threshold current Id is larger as the SOC value is higher, and the absolute value of the discharge threshold current Id is smaller as the SOC value is lower (see FIG. 18). While the SOC is constant (column component), the absolute value of the discharge threshold current Id is larger as the battery temperature is higher, and the absolute value of the discharge threshold current Id is smaller as the battery temperature is lower (see FIG. 17).

In S403, the charge threshold current Ic and the discharge threshold current Id are read from the above battery temperature-SOC dependence maps. In the present embodiment, the charge threshold current Ic and the discharge threshold current Id, which are different in every measuring period, are read as mentioned above. Thus, a charge threshold current Ic(t) and a discharge threshold current Id(t) are values changing over time.

A modified example of the present embodiment is explained below. In the present embodiment, the current limiting is performed on either a charge current or a discharge current based on the magnitude correlation between the charge hysteresis value Cc and the discharge hysteresis value Cd. As an alternative, the current limiting may not be conducted when the difference between the charge hysteresis value Cc and the discharge hysteresis value Cd is small as in the second embodiment. As another alternative, the current limiting may be set by also taking into consideration the accumulated charge hysteresis value SCc and the accumulated discharge hysteresis value SCd. Further, the current limiting may be set based on a plurality of the charge hysteresis values Cc and a plurality of the discharge hysteresis values Cd.

As explained in detail above, the nonaqueous electrolyte type lithium ion secondary battery system in the present embodiment sets the current limiting on charge or discharge when the high-rate charge or discharge is continuously performed. This can avoid unevenness of the salt concentration distribution. By preventing the salt concentration distribution from becoming uneven, thereby preventing an increase in internal resistance, the battery system 100, hybrid system 10, hybrid vehicle 1 can have a prolonged endurance life.

The present embodiment is a mere example and does not give any limitations to the present invention. Thus, the present invention may be embodied in other specific forms without departing from the essential characteristics thereof. For instance, the present invention is applicable to not only the nonaqueous electrolyte type lithium ion secondary battery but also another nonaqueous electrolyte type secondary battery in which an electrolyte has a higher viscosity than water and an ion diffusion velocity is low.

The running modes of the hybrid vehicle are mere examples and are not limited to the aforementioned ones. In the above embodiment, the nonaqueous electrolyte type lithium ion secondary battery is applied to the hybrid vehicle but not limited to the hybrid vehicle. In other words, it may be used in other vehicles such as an electric vehicle and a fuel battery car. The above embodiment uses the charge threshold current Ic and the discharge threshold current Id but may use thresholds for electric power instead. The current limiting flow in the above embodiment is repeated in every measurement period. As an alternative, after the charge hysteresis value Cc and the discharge hysteresis value Cd are measured once, such measurement is not conducted again and the same current limiting is applied continuously.

Fifth Embodiment

A fifth embodiment will be explained below. A hybrid vehicle 1, a hybrid system 10, a PCU 200, and a battery system 100 in this embodiment have the same mechanical structures as those in the first embodiment. A different point from the first embodiment is in that a memory 155 stores an estimating map of a salt concentration distribution in an electrolyte corresponding to a charge hysteresis value Cc and a discharge hysteresis value Cd.

Specifically, the battery control part 151 and the memory 155 serve as a salt concentration estimating part for estimating a salt concentration distribution in the electrolyte of the battery 50 based on the charge hysteresis value Cc and the discharge hysteresis value Cd. Further, the battery control part 151 includes a charge and discharge hysteresis value calculating part as in the first embodiment. Accordingly, the PCU 200 in the present embodiment includes the charge and discharge hysteresis value calculating part and the salt concentration estimating part.

In the present embodiment, a ratio Rcd of the charge hysteresis value Cc to the discharge hysteresis value Cd:

$$Rcd = Cc/Cd$$

is used to estimate the salt concentration in the electrolyte. This ratio Rcd is associated with a model of the salt concentration distribution in the electrolyte. The salt concentration in the electrolyte is estimated in this way.

Figure 19:
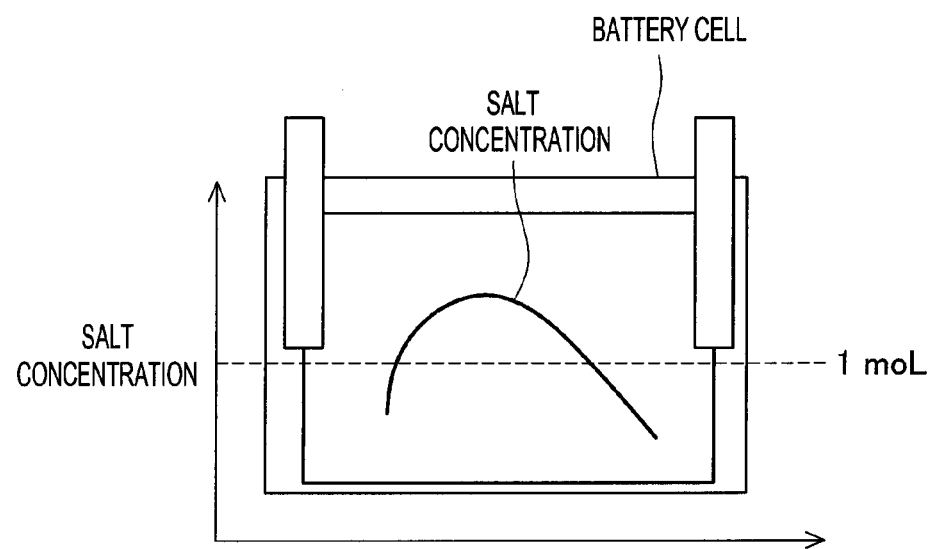
FIG. 19 is a conceptual diagram to explain a salt concentration distribution in a battery when excessively charged.
Figure 20:
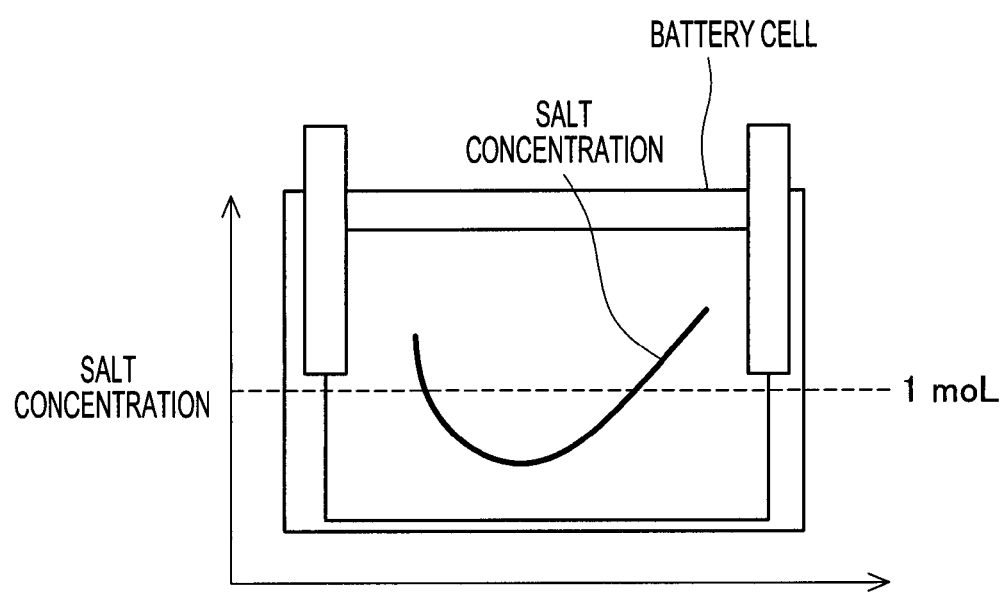
FIG. 20 is a conceptual diagram to explain a salt concentration distribution in a battery when excessively discharged.

The memory 155 has a one-dimensional table for associating the ratio Rcd with the model of the salt concentration distribution in the electrolyte. FIGS. 19 and 20 are conceptual diagrams showing salt concentration distribution models. The memory 155 stores numerical data of the concentration of electrolyte shown in FIGS. 19 and 20.

FIG. 19 is a conceptual diagram showing a salt concentration distribution in one secondary battery, i.e., a battery cell constituting the battery 50. Both ends of the battery cell are electrodes. FIG. 19 shows a salt concentration distribution in the case of overcharging. The salt concentration remarkably decreases in the vicinity of the electrodes and thus reaction is hard to occur on the surface of each electrode. Accordingly, the internal resistance of the battery increases. Further, salt concentration is high in and near an intermediate area between the electrodes. Viscosity of the electrolyte increases as the salt concentration is higher. Thus, the moving velocity of ions slows down, leading to an increase in internal resistance.

FIG. 20 is a conceptual diagram showing a salt concentration distribution in the case where the battery cell is continuously used in an overdischage condition. The salt concentration remarkably rises near the electrodes. Reaction is therefore likely to occur on the surface of each electrode. However, the salt concentration is high and thus the ion moving velocity near the electrodes is low. Consequently, the internal resistance also increases even in this case.

Herein, a salt concentration estimating flow to be executed by the salt concentration estimating part will be explained. The salt concentration estimating part obtains a temperature of a battery cell and a voltage value and a current value output from the battery 50, through the battery control part 151. The salt concentration estimating part further obtains a charge hysteresis value Cc and a discharge hysteresis value Cd from the battery control part 151. These charge hysteresis value Cc and discharge hysteresis value Cd are values calculated at a predetermined time.

The charge hysteresis value Cc used at that time is selectable from the aforementioned expressions (1), (3), (5), (7), and (9). Similarly, the discharge hysteresis value Cd is selectable from the aforementioned expressions (2), (4), (6), (8), and (10). It is however preferable to use the charge threshold current Ic defined in the fourth embodiment and use the charge hysteresis value Cc defined by the expression (1). Because they are obtained by digitizing high-rate charge and discharge in consideration of temperature-SOC dependence. Similarly, it is preferable to use the discharge threshold current Id defined in the fourth embodiment and use the discharge hysteresis value Cd defined by the expression (2).

The battery control part 151 calculates the ratio Rcd of the charge hysteresis value Cc to the discharge hysteresis value Cd as the following expression.

$$Rcd=Cc/Cd$$

Then, the salt concentration distribution is read from the one-dimensional table stored in the memory 155 in which the ratio Rcd is associated with the salt concentration distribution. The salt concentration distribution is thus estimated. The estimated salt concentration distribution is written in the memory 155. The salt concentration distribution estimated at that time is stored. Based on this estimated salt concentration distribution, the coming of endurance life of the battery 50 can be determined.

A modified example of the present embodiment is explained below. The salt concentration estimating table may be a two-dimensional table created with two components; the charge hysteresis value Cc and the discharge hysteresis value Cd. As an alternative, a table created by taking into consideration the accumulated charge hysteresis value SCc and the accumulated discharge hysteresis value SCd may be used. Furthermore, as another alternative, a table created by taking into consideration a battery temperature, an SOC, and others may also be used.

As explained in detail above, the nonaqueous electrolyte type lithium ion secondary battery in the present embodiment is arranged to estimate the salt concentration distribution in the electrolyte based on the charge hysteresis value Cc and the discharge hysteresis value Cd when high-rate charge or discharge is continuously conducted. This can prevent the salt concentration distribution from becoming uneven and hence prevent the increase in internal resistance. Thus, the battery system 100, hybrid system 10, and hybrid vehicle 1 can have a long endurance life. Further, it is possible to avoid the region of a current to be used for charge and discharge from becoming narrow.

The present embodiment is a mere example and does not give any limitations to the present invention. Thus, the present invention may be embodied in other specific forms without departing from the essential characteristics thereof. For instance, the present invention is applicable to not only the nonaqueous electrolyte type lithium ion secondary battery but also another nonaqueous electrolyte type secondary battery in which an electrolyte has a higher viscosity than water and an ion diffusion velocity is low.

The running modes of the hybrid vehicle are examples and are not limited to the aforementioned ones. In the above embodiment, the nonaqueous electrolyte type lithium ion secondary battery is applied to the hybrid vehicle but not limited to the hybrid vehicle. In other words, it may be used in other vehicles such as an electric vehicle and a fuel battery car. The above embodiment uses the charge threshold current Ic and the discharge threshold current Id but may use thresholds for electric power instead. The current limiting flow in the above embodiment is repeated in every measurement period. As an alternative, after the charge hysteresis value Cc and the discharge hysteresis value Cd are measured once, such measurement is not conducted again and the same current limiting is applied continuously.

The invention claimed is:

1. A nonaqueous electrolyte type secondary battery system comprising:
   a nonaqueous electrolyte type secondary battery; and
   a control part programmed to control the nonaqueous electrolyte type secondary battery, wherein
   the control part includes:
      a charge and discharge hysteresis value calculating part programmed to calculate, at predetermined time intervals,
      a charge hysteresis value Cc representing a history of charge with a current exceeding a predetermined charge threshold current Ic, and
      a discharge hysteresis value Cd representing a history of discharge with a current exceeding a predetermined discharge threshold current Id; and
      a current limiting part programmed to limit the charge current or the discharge current after a difference between the charge hysteresis value Cc and the discharge hysteresis value Cd is determined to be larger than a predetermined degree,
   the current limiting part is programmed to:
   limit the charge current when the charge hysteresis value Cc is larger than the discharge hysteresis value Cd, and
   limit the discharge current when the charge hysteresis value Cc is smaller than the discharge hysteresis value Cd.

2. The nonaqueous electrolyte type secondary battery system according to claim 1, wherein the nonaqueous electrolyte type secondary battery is a nonaqueous electrolyte type lithium ion secondary battery.

3. The nonaqueous electrolyte type secondary battery system according to claim 1, wherein
   the current limiting part is programmed to:
   limit the charge current when the charge hysteresis value Cc is equal to or larger than a value calculated by adding a predetermined positive reference value to the discharge hysteresis value Cd; and
   limit the discharge current when the discharge hysteresis value Cd is equal to or larger than a value calculated by adding a predetermined positive reference value to the charge hysteresis value Cc.

4. The nonaqueous electrolyte type secondary battery system according to claim 1, wherein
   the current limiting part is programmed to:
   limit the charge current when a ratio of the charge hysteresis value Cc to the discharge hysteresis value Cd is larger than a first reference value that is a predetermined number equal to or larger than 1; and
   limit the discharge current when a ratio of the discharge hysteresis value Cd to the charge hysteresis value Cc is larger than a second reference value that is a predetermined number equal to or larger than 1.

5. The nonaqueous electrolyte type secondary battery system according to claim 4, wherein
   the current limiting part is programmed to perform no current limiting
   when the ratio of the charge hysteresis value Cc to the discharge hysteresis value Cd is equal to or smaller than the first reference value, and the ratio of the discharge hysteresis value Cd to the charge hysteresis value Cc is equal to or smaller than the second reference value.

6. The nonaqueous electrolyte type secondary battery system according to claim 1, wherein
   the charge and discharge hysteresis value calculating part is programmed to use,
   as the charge hysteresis value Cc, a value defined by the following expression:

$$Cc=|\int [I(t)-Ic(t)]dt|$$

where an integral interval is an interval of time "t" in which I(t)≥Ic(t) is established, and Ic(t) is a predetermined threshold current, and as the discharge hysteresis value Cd, a value defined by the following expression:

$$Cd = |\int [I(t) - Id(t)] dt|$$

where an integral interval is an interval of time "t" in which I(t)≥Id(t) is established, and Id(t) is a predetermined threshold current.

7. The nonaqueous electrolyte type secondary battery system according to claim 1, wherein the charge and discharge hysteresis value calculating part is programmed to use, as the charge hysteresis value Cc, a value defined by the following expression:

$$Cc = |\int I(t) dt|$$

where an integral interval is an interval of time "t" in which I(t)≥Ic(t) is established, and Ic(t) is a predetermined threshold current, and as the discharge hysteresis value Cd, a value defined by the following expression:

$$Cd = |\int I(t) dt|$$

where an integral interval is an interval of time "t" in which I(t)≥Id(t) is established, and Id(t) is a predetermined threshold current.

8. The nonaqueous electrolyte type secondary battery system according to claim 1, wherein the charge and discharge hysteresis value calculating part is programmed to use, as the charge hysteresis value Cc, a value defined by the following expression:

$$Cc = Ic \cdot Tc$$

where Tc is a time in which I(t)≥Ic was established, and as the discharge hysteresis value Cd, a value defined by the following expression:

$$Cd = Id \cdot Td$$

where Td is a time in which I(t)≤Id was established.

9. The nonaqueous electrolyte type secondary battery system according to claim 1, wherein the charge and discharge hysteresis value calculating part is programmed to use, as the charge hysteresis value Cc, a value defined by the following expression:

$$Cc = Imax \cdot Tc$$

where Tc is a time in which I(t)≥Ic was established, and

Imax: a maximum current value within the measuring time, and as the discharge hysteresis value Cd, a value defined by the following expression:

$$Cd = Imin \cdot Td$$

where Td is a time in which I(t)≤Id was established,

Imin: a minimum current value within the measuring time.

10. The nonaqueous electrolyte type secondary battery system according to claim 1, wherein the charge and discharge hysteresis value calculating part is programmed to use, as the charge hysteresis value Cc, a time Tc in which I(t)≥Ic was established, and as the discharge hysteresis value Cd, a time Td in which I(t)≤Id was established.

11. The nonaqueous electrolyte type secondary battery system according to claim 6, wherein the charge and discharge hysteresis value calculating part is programmed to use, as the charge hysteresis value Cc, an accumulated hysteresis value SCc calculated by adding a currently calculated charge hysteresis value Cc to a sum of charge hysteresis values Cc calculated previously, and as the discharge hysteresis value Cd, an accumulated hysteresis value SCd calculated by adding a currently calculated discharge hysteresis value Cd to a sum of discharge hysteresis values Cd calculated previously.

12. The nonaqueous electrolyte type secondary battery system according to claim 1, wherein when a current value when the current limiting is assumed not performed exceeds a predetermined limit value, the current limiting part is programmed to flow a current of the limit value instead of the current value with no current limiting.

13. The nonaqueous electrolyte type secondary battery system according to claim 1, wherein the current limiting part is programmed to flow a current of a value calculated by multiplying a current value when the current limiting is assumed not performed by a predetermined coefficient smaller than 1.

14. The nonaqueous electrolyte type secondary battery system according to claim 1, wherein when a current value when the current limiting is assumed not performed exceeds a predetermined limit value, the current limiting part is programmed to flow a current corresponding to a sum of a value calculated by multiplying an excess amount of the current value exceeding the limit value by a predetermined coefficient smaller than 1 and the limit value instead of the current value with no current limiting.

15. The nonaqueous electrolyte type secondary battery system according to claim 1, wherein the current limiting part is programmed to set, for limiting the charge current, a value of the discharge threshold current Id to be used in a next measurement to be larger than a value in a previous measurement, and for limiting the discharge current, a value of the charge threshold current Ic to be used in the next measurement to be larger than a value in the previous measurement.

16. The nonaqueous electrolyte type secondary battery system according to claim 1, wherein the charge and discharge hysteresis value calculating part is programmed to use, as the charge threshold current Ic, a smaller value in absolute value as an SOC (State of Charge) value is larger and a larger value in absolute value as the SOC value is smaller, and a larger value in absolute value as a battery temperature is higher and a smaller value in absolute value as the battery temperature is lower, and as the discharge threshold current Id, a larger value in absolute value as the SOC value is larger and a smaller value in absolute value as the SOC value is smaller, and a larger value in absolute value as the battery temperature is higher and a smaller value in absolute value as the battery temperature is lower.

17. A vehicle comprising:

a motor;

a nonaqueous electrolyte type secondary battery; and a control part programmed to control the nonaqueous electrolyte type secondary battery, wherein
the control part includes:
- a charge and discharge hysteresis value calculating part programmed to calculate, at predetermined time intervals,
- a charge hysteresis value Cc representing a history of charge with a current exceeding a predetermined charge threshold current Ic, and
- a discharge hysteresis value Cd representing a history of discharge with a current exceeding a predetermined discharge threshold current Id; and
- a current limiting part programmed to limit the charge current or the discharge current after a difference between the charge hysteresis value Cc and the discharge hysteresis value Cd is determined to be larger than a predetermined degree, the current limiting part is programmed to:
limit the charge current when the charge hysteresis value Cc is larger than the discharge hysteresis value Cd, and
limit the discharge current when the charge hysteresis value Cc is smaller than the discharge hysteresis value Cd.

18. A nonaqueous electrolyte type secondary battery system comprising:
- a nonaqueous electrolyte type secondary battery; and
- a control part programmed to control the nonaqueous electrolyte type secondary battery, wherein
the control part includes:
- a charge and discharge hysteresis value calculating part programmed to calculate, at predetermined time intervals,
- a charge hysteresis value Cc representing a history of charge with a current exceeding a predetermined charge threshold current Ic, and
- a discharge hysteresis value Cd representing a history of discharge with a current exceeding a predetermined discharge threshold current Id; and
- a salt concentration estimating part programmed to estimate a salt concentration distribution in an electrolyte of the nonaqueous electrolyte type secondary battery based on the charge hysteresis value Cc and the discharge hysteresis value Cd.

19. A vehicle comprising:
a motor;
a nonaqueous electrolyte type secondary battery; and
a control part programmed to control the nonaqueous electrolyte type secondary battery, wherein
the control part includes:
- a charge and discharge hysteresis value calculating part programmed to calculate, at predetermined time intervals,
- a charge hysteresis value Cc representing a history of charge with a current exceeding a predetermined charge threshold current Ic, and
- a discharge hysteresis value Cd representing a history of discharge with a current exceeding a predetermined discharge threshold current Id; and
- a salt concentration estimating part programmed to estimate a salt concentration distribution in an electrolyte of the nonaqueous electrolyte type secondary battery based on the charge hysteresis value Cc and the discharge hysteresis value Cd.

20. The nonaqueous electrolyte type secondary battery system according to claim 2, wherein
the current limiting part is programmed to:
limit the charge current when the charge hysteresis value Cc is equal to or larger than a value calculated by adding a predetermined positive reference value to the discharge hysteresis value Cd; and
limit the discharge current when the discharge hysteresis value Cd is equal to or larger than a value calculated by adding a predetermined positive reference value to the charge hysteresis value Cc.

* * * * *